US011216632B2

(12) United States Patent
Chau et al.

(10) Patent No.: US 11,216,632 B2
(45) Date of Patent: Jan. 4, 2022

(54) ULTRASONIC FINGERPRINT SENSOR WITH A CONTACT LAYER OF NON-UNIFORM THICKNESS

(71) Applicant: InvenSense, Inc., San Jose, CA (US)

(72) Inventors: Quy Chau, San Jose, CA (US); Mei-Lin Chan, Milpitas, CA (US); Xiaoyue Jiang, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/741,030

(22) Filed: Jan. 13, 2020

(65) Prior Publication Data

US 2021/0019487 A1   Jan. 21, 2021

Related U.S. Application Data

(60) Provisional application No. 62/875,479, filed on Jul. 17, 2019.

(51) Int. Cl.
*G06K 9/00*         (2006.01)
*G06F 3/043*        (2006.01)

(52) U.S. Cl.
CPC ......... *G06K 9/0002* (2013.01); *G06F 3/0436* (2013.01)

(58) Field of Classification Search
None
See application file for complete search history.

(56) References Cited

U.S. PATENT DOCUMENTS 4,880,012 A   11/1989   Sato
5,575,286 A   11/1996   Weng et al.
(Continued)

FOREIGN PATENT DOCUMENTS

CN    1826631 A      8/2006
CN    102159334 A    8/2011
(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Nicholas J Lee

(57) ABSTRACT

An ultrasonic sensor includes a two-dimensional array of ultrasonic transducers, wherein the two-dimensional array of ultrasonic transducers is substantially flat, a contact layer having a non-uniform thickness overlying the two-dimensional array of ultrasonic transducers, and an array controller configured to control activation of ultrasonic transducers during an imaging operation for imaging a plurality of pixels at a plurality of positions within the two-dimensional array of ultrasonic transducers. For imaging a pixel of the plurality of pixels, the array controller is configured to activate a first subset of ultrasonic transducers of the two-dimensional array of ultrasonic transducers to generate an ultrasonic beam directed to a contact surface of the contact layer, and activate a second subset of ultrasonic transducers of the two-dimensional array of ultrasonic transducers to receive a reflected ultrasonic beam, wherein the second subset of ultrasonic transducers is at a location within the two-dimensional array of ultrasonic transducers to account for a local angle between the two-dimensional array of ultrasonic transducers and the contact surface where the ultrasonic beam interacts with the contact surface.

22 Claims, 9 Drawing Sheets

(56) References Cited

U.S. PATENT DOCUMENTS

| | | |
|---|---|---|
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,292,576 B1 | 9/2001 | Brownlee |
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,387,704 B2 | 8/2019 | Dagan et al. |
| 10,461,124 B2 | 10/2019 | Berger et al. |
| 10,478,858 B2 | 11/2019 | Lasiter et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,755,067 B2 | 8/2020 | De Foras et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2006/0230605 A1 | 10/2006 | Schlote-Holubek et al. |
| 2006/0280346 A1 | 12/2006 | Machida |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095347 A1 | 4/2012 | Adam et al. |
| 2012/0147698 A1 | 6/2012 | Wong et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |

(56) References Cited

U.S. PATENT DOCUMENTS

| | | |
|---|---|---|
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0145374 A1 | 5/2015 | Ku et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0199552 A1* | 7/2015 | Du .................. G06K 9/4642 382/124 |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0371398 A1 | 12/2015 | Qiao et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0326477 A1 | 11/2016 | Fernandez-Alcon et al. |
| 2016/0350573 A1* | 12/2016 | Kitchens, II ......... G06K 9/0002 |
| 2016/0358003 A1 | 12/2016 | Shen et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1* | 11/2017 | Chrisikos ............... G01S 15/32 |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0178251 A1 | 6/2018 | Foncellino et al. |
| 2018/0206820 A1 | 7/2018 | Anand et al. |
| 2018/0225495 A1 | 8/2018 | Jonsson et al. |
| 2018/0229267 A1 | 8/2018 | Ono et al. |
| 2018/0276443 A1 | 9/2018 | Strohmann et al. |
| 2018/0329560 A1 | 11/2018 | Kim et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1* | 1/2019 | Chakraborty .......... G07D 7/206 |
| 2019/0018123 A1 | 1/2019 | Narasimha-Iyer et al. |
| 2019/0057267 A1 | 2/2019 | Kitchens et al. |
| 2019/0073507 A1 | 3/2019 | D'Souza et al. |
| 2019/0087632 A1* | 3/2019 | Raguin ............... G06K 9/00919 |
| 2019/0095015 A1 | 3/2019 | Han et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0325185 A1 | 10/2019 | Tang |
| 2019/0340455 A1 | 11/2019 | Jung et al. |
| 2019/0370518 A1* | 12/2019 | Maor .................... A61B 8/5223 |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1* | 2/2020 | Iatsun .................. G06K 9/0008 |
| 2020/0050828 A1 | 2/2020 | Li et al. |
| 2020/0074135 A1 | 3/2020 | Garlepp et al. |
| 2020/0125710 A1 | 4/2020 | Andersson et al. |
| 2020/0147644 A1 | 5/2020 | Chang |
| 2020/0158694 A1 | 5/2020 | Garlepp et al. |
| 2020/0175143 A1 | 6/2020 | Lee et al. |
| 2020/0210666 A1 | 7/2020 | Flament |
| 2020/0285882 A1* | 9/2020 | Skovgaard Christensen ............... G06K 9/0008 |
| 2020/0302140 A1 | 9/2020 | Lu et al. |

FOREIGN PATENT DOCUMENTS

| | | |
|---|---|---|
| CN | 105264542 A | 1/2016 |
| CN | 105378756 A | 3/2016 |
| CN | 109255323 A | 1/2019 |
| EP | 1214909 A1 | 6/2002 |
| EP | 2884301 A1 | 6/2015 |
| EP | 3086261 A2 | 10/2016 |
| JP | 2011040467 A | 2/2011 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196682 A1 | 11/2017 |

(56) References Cited

FOREIGN PATENT DOCUMENTS

| | | |
|---|---|---|
| WO | 2017192903 A3 | 12/2017 |
| WO | 2019164721 A1 | 8/2019 |

OTHER PUBLICATIONS

ISA/EP, Partial International Search Report for International Application No. PCT/US2019/034032, 8 pages, dated Sep. 12, 2019, 8.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, dated Aug. 29, 2017.

ISA/EP, International Search Report and Written Opinion for International Application No. PCT/US2017/031120, 13 pages, dated Sep. 1, 2017.

ISA/EP, International Search Report and Written Opinion for International Application No. PCT/US2017/031134, 12 pages, dated Aug. 30, 2017.

ISA/EP, International Search Report and Written Opinion for International Application No. PCT/US2017/031140, 18 pages, dated Nov. 2, 2017.

ISA/EP, International Search Report and Written Opinion for International Application No. PCT/US2017/031421 13 pages, dated Jun. 21, 2017.

ISA/EP, International Search Report and Written Opinion for International Application No. PCT/US2017/031426 13 pages, dated Jun. 22, 2017.

ISA/EP, International Search Report and Written Opinion for International Application No. PCT/US2017/031431, 14 pages, dated Aug. 1, 2017.

ISA/EP, International Search Report and Written Opinion for International Application No. PCT/US2017/031434, 13 pages, dated Jun. 26, 2017.

ISA/EP, International Search Report and Written Opinion for International Application No. PCT/US2017/031439, 10 pages, dated Jun. 20, 2017.

ISA/EP, International Search Report and Written Opinion for International Application No. PCT/US2017/031824, 18 pages, dated Sep. 22, 2017.

ISA/EP, International Search Report and Written Opinion for International Application No. PCT/US2017/031827, 16 pages, dated Aug. 1, 2017.

ISA/EP, International Search Report and Written Opinion for International Application No. PCT/US2017/031831, 12 pages, dated Jul. 21, 2017.

ISA/EP, International Search Report and Written Opinion for International Application No. PCT/US2018/037364, 10 pages, dated Sep. 3, 2018.

ISA/EP, International Search Report for International Application No. PCT/US2017/031826, 16 pages, dated Feb. 27, 2018.

ISA/EP, Partial International Search Report for International Application No. PCT/US2017/031140, 13 pages, dated Aug. 29, 2017.

ISA/EP, Partial International Search Report for International Application No. PCT/US2017/031823, 12 pages, dated Nov. 30, 2017.

"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.

"TMS320C5515 Fingerprint Development Kit (FDK) Hardware Guide", Texas Instruments, Literature No. SPRUFX3, XP055547651, Apr. 2010, 1-26.

"ZTE V7 Max. 5,5" smartphone on MediaTeck Helio P10 cpu; Published on Apr. 20, 2016; https://www.youtube.com/watch?v=ncNCbpkGQzU (Year: 2016).

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Jiang, et al., "Ultrasonic Fingerprint Senseor with Transmit Beamforming Based on a PMUT Array Bonded to CMOS Circuitry", IEEE Transactions on Ultrasonics Ferroelectrics and Frequency Control, Jan. 1, 2017, 1-9.

Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerprints", 2010 IEEE International Ultrasonics Symposium Proceedings, Oct. 2010, 1877-1880.

(56) References Cited

OTHER PUBLICATIONS

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

Zhou, et al., "Partial Fingerprint Reconstruction with Improved Smooth Extension", Network and System Security, Springer Berlin Heidelberg, Jun. 3, 2013, 756-762.

ISA/EP, International Search Report and Written Opinion for International Application No. PCT/US2020/033854, 16 pages, dated Nov. 3, 2020.

ISA/EP, International Search Report and Written Opinion for International Application No. PCT/US2020/039208, 10 pages, dated Oct. 9, 2020.

ISA/EP, International Search Report and Written Opinion for International Application No. PCT/US2020/039452, 11 pages, dated Sep. 9, 2020.

ISA/EP, International Search Report and Written Opinion for International Application No. PCT/US2020/042427, 18 pages, dated Dec. 14, 2020.

ISA/EP, International Search Report and Written Opinion for International Application No. PCT/US2020/042428, 9 pages, dated Oct. 26, 2020.

ISA/EP, International Search Report and Written Opinion for International Application No. PCT/US2021/021412, 12 pages, dated Jun. 9, 2021.

ISA/EP, Partial Search Report and Provisional Opinion for International Application No. PCT/US2020/042427, 13 pages, dated Oct. 26, 2020.

ISA/EP, Partial Search Report for International Application No. PCT/US2020/033854, 10 pages, dated Sep. 8, 2020.

Office Action for CN App No. 201780029016.7 dated Mar. 24, 2020, 7 pages.

Office Action for CN App No. 201780029016.7 dated Sep. 25, 2020, 7 pages.

Tang, et al., "11.2 3D Ultrasonic Fingerprint Sensor-on-a-Chip", 2016 IEEE International Solid-State Circuits Conference, IEEE, Jan. 31, 2016, 202-203.

ISA/EP, International Search Report and Written Opinion for International Application No. PCT/US2019061516, 14 pages, dated Mar. 12, 2020.

Taiwan Application No. 106114623, 1st Office Action, dated Aug. 5, 2021, pp. 1-8.

EP Office Action, dated Oct. 9, 2021, 6 pages.

European Patent Office, Office Action, App 17725018, pp. 5, dated Oct. 25, 2021.

Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.

* cited by examiner

900

```
PERFORM AN IMAGING OPERATION AT A PLURALITY OF POSITIONS
WITHIN A TWO-DIMENSIONAL ARRAY OF ULTRASONIC TRANSDUCERS TO
GENERATE A PLURALITY OF PIXELS 910

ACTIVATE A FIRST SUBSET OF ULTRASONIC TRANSDUCERS TO
    GENERATE AN ULTRASONIC BEAM DIRECTED TO A CONTACT
    SURFACE OF THE ULTRASONIC SENSOR 920

GENERATE AN ULTRASONIC            GENERATE AN ULTRASONIC
        BEAM FOCUSED                       BEAM FOCUSED
        PERPENDICULAR TO THE               PERPENDICULAR TO SURFACE
        CONTACT SURFACE 922                OF THE SENSING LAYER 924

ACTIVATE A SECOND SUBSET OF ULTRASONIC TRANSDUCERS TO
    RECEIVE A REFLECTED ULTRASONIC BEAM, WHEREIN THE SECOND
    SUBSET OF ULTRASONIC TRANSDUCERS IS AT A LOCATION WITHIN
    THE TWO-DIMENSIONAL ARRAY OF ULTRASONIC TRANSDUCERS TO
    ACCOUNT FOR A LOCAL ANGLE BETWEEN THE TWO-DIMENSIONAL
    ARRAY OF ULTRASONIC TRANSDUCERS AND THE CONTACT
    SURFACE WHERE THE ULTRASONIC BEAM INTERACTS WITH THE
    CONTACT SURFACE 930

ACTIVATE SECOND SUBSET            ACTIVATE SECOND SUBSET
        THAT IS CIRCUMSCRIBED BY          THAT IS NOT CIRCUMSCRIBED
        THE FIRST SUBSET 932              BY THE FIRST SUBSET 934

GENERATE A PIXEL 940

GENERATE IMAGE SEGMENTS USING GROUPS OF PIXELS 945

GENERATE AN IMAGE USING THE PLURALITY OF PIXELS 950
```

*FIG. 9*

ULTRASONIC FINGERPRINT SENSOR WITH A CONTACT LAYER OF NON-UNIFORM THICKNESS

RELATED APPLICATIONS

This application claims also priority to and the benefit of U.S. Provisional Patent Application 62/875,479, filed on Jul. 17, 2019, entitled "FINGERPRINT IMAGING UNDER CURVED SURFACE," by Quy Chau et al. and assigned to the assignee of the present application, which is incorporated herein by reference in its entirety.

BACKGROUND

Fingerprint sensors have become ubiquitous in mobile devices as well as other applications for authenticating a user's identity. They provide a fast and convenient way for the user to unlock a device, provide authentication for payments, etc. Current fingerprint sensors are typically area sensors that obtain a two-dimensional image of the user's finger area presented to the sensor. Different technologies can be used to image the finger such as capacitive, ultrasound, and optical sensing. Once an image is obtained, that image is processed by a matcher to extract features and to compare against stored images to authenticate the user. As such, accuracy of captured images is essential to the performance of image matching for user authentication.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 9 illustrates a flow diagram of an example method for capturing an image at an ultrasonic sensor, according to embodiments.

DESCRIPTION OF EMBODIMENTS

Figure 1A:
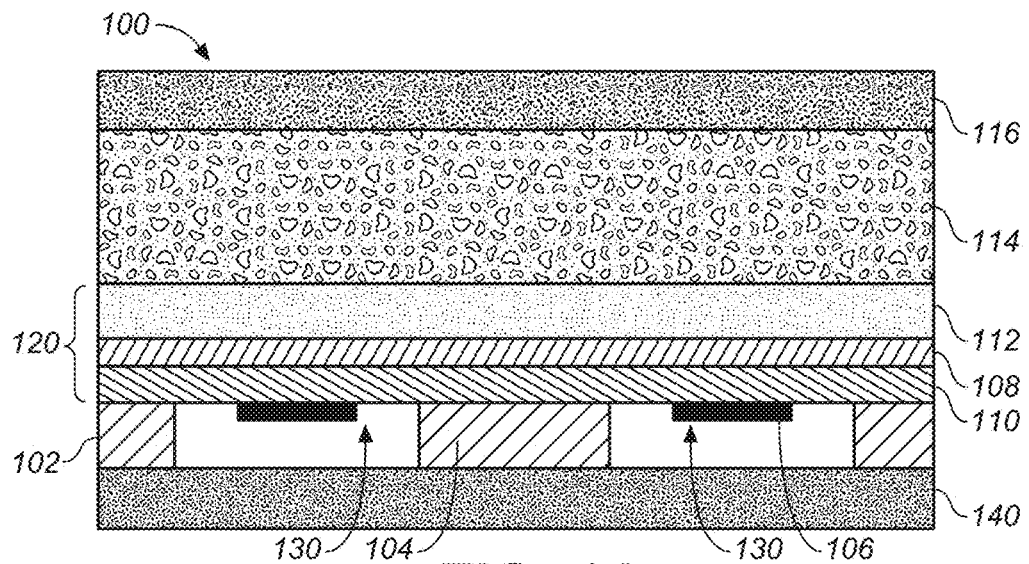
FIG. 1A is a diagram illustrating a piezoelectric micromachined ultrasonic transducer (PMUT) device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "performing," "activating," "generating," "combining," "transmitting," "receiving," "repeating," "measuring," "selecting," "determining," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example piezoelectric micromachined ultrasonic transducer (PMUT), in accordance with various embodiments. Example arrays including PMUT devices are then described. Example operations of example arrays of ultrasonic transducers (e.g., PMUT devices) are then further described, including the use of multiple PMUT devices to form a beam for capturing a pixel. Examples of the ultrasonic fingerprint sensors having contact layers with non-uniform thickness are then described. Examples of accounting for non-uniform thickness of a contact layer in an ultrasonic fingerprint sensor are then described.

Fingerprint sensors, in accordance with the described embodiments, are used for capturing fingerprint images that are used for performing fingerprint authentication. As the use of fingerprint sensors proliferates, there is a desire to include fingerprint sensors in devices having varying form factors. In many potential use cases, an ultrasonic fingerprint sensor that is substantially flat is overlaid with a contact layer that is not flat (e.g., has a curved profile, rounded edges, etc.), thus having a varying thickness. This variation in material thickness results in a skewing or redirection of the return signal (e.g., reflected ultrasonic beam), which can result in image artifacts related to contact layer curvature and acoustic wavelength. For instance, a contact layer having a non-uniform thickness will cause acoustic wave reflection at a non-perpendicular angle at many points of reflection (e.g., the points on the contact layer where the beam is reflected). Where a beam is transmitted at a perpendicular angle from the fingerprint sensor through the contact layer having a non-uniform thickness, at some points of reflection the reflected beam will not be reflected back to the point of origin of the transmitted beam, but rather to another point on the ultrasonic sensor. Embodiments described herein account for the skewing of the reflected ultrasonic beam caused by the varying thickness of the contact layer.

Embodiments described herein provide a sensor device including a two-dimensional array of ultrasonic transducers, wherein the two-dimensional array of ultrasonic transducers is substantially flat, a contact layer having a non-uniform thickness overlying the two-dimensional array of ultrasonic transducers, and an array controller configured to control activation of ultrasonic transducers during an imaging operation for imaging a plurality of pixels at a plurality of positions within the two-dimensional array of ultrasonic transducers. For imaging a pixel of the plurality of pixels, the array controller is configured to activate a first subset of ultrasonic transducers of the two-dimensional array of ultrasonic transducers to generate an ultrasonic beam directed to a contact surface of the contact layer. The array controller is also configured to activate a second subset of ultrasonic transducers of the two-dimensional array of ultrasonic transducers to receive a reflected ultrasonic beam, wherein the second subset of ultrasonic transducers is at a location within the two-dimensional array of ultrasonic transducers to account for a local angle between the two-dimensional array of ultrasonic transducers and the contact surface where the ultrasonic beam interacts with the contact surface. In some embodiments, the array controller is further configured to combine the plurality of pixels captured at the plurality of positions into an image.

In some embodiments, the array controller is configured to activate the first subset of ultrasonic transducers of the two-dimensional array of ultrasonic transducers to generate the ultrasonic beam such that the ultrasonic beam is focused and steered such that the reflected ultrasonic beam is directed back substantially to the transmit location, such that the receive location can be collocated with or circumscribed by the transmit location, according to an embodiment. In one embodiment, the ultrasonic beam is focused perpendicular to the contact surface of the contact layer. In some embodiments, the ultrasonic beam is steered by using phase delay patterns for activating ultrasonic transducers to direct the ultrasonic beam at an angle such that the ultrasonic beam interacts with the contact surface of the contact layer at a perpendicular angle. In some embodiments, a transmit angle between the ultrasonic beam and the two-dimensional array of ultrasonic transducers for at least a portion of positions of the plurality of positions is not a perpendicular angle. In some embodiments, the array controller is configured to activate the second subset of ultrasonic transducers of the two-dimensional array of ultrasonic transducers such that the second subset of ultrasonic transducers is circumscribed by the first subset of ultrasonic transducers.

In some embodiments, the array controller is configured to activate the first subset of ultrasonic transducers of the two-dimensional array of ultrasonic transducers to generate the ultrasonic beam such that the ultrasonic beam is focused perpendicular to the two-dimensional array of ultrasonic transducers. In some embodiments, the ultrasonic beam is steered by using phase delay patterns for activating ultrasonic transducers to direct the ultrasonic beam at an angle perpendicular to the two-dimensional array of ultrasonic transducers. In some embodiments, a reflection angle between the ultrasonic beam and the reflected ultrasonic beam for at least a portion of positions of the plurality of positions is not a perpendicular angle. In some embodiments, the array controller is configured to activate the second subset of ultrasonic transducers of the two-dimensional array of ultrasonic transducers such that the second subset of ultrasonic transducers is not circumscribed by the first subset of ultrasonic transducers.

Piezoelectric Micromachined Ultrasonic Transducer (PMUT)

Systems and methods disclosed herein, in one or more aspects provide efficient structures for an acoustic transducer (e.g., a piezoelectric micromachined actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

Embodiments described herein provide ultrasonic fingerprint sensors having non-uniform contact layers. It should be appreciated that different types of ultrasonic fingerprint sensors having different architectures may be utilized herein. For instance, some architectures include an array of ultrasonic transducers (e.g., PMUTs), embodiments of which are described herein. In some embodiments, the ultrasonic transducers may be bulk piezo actuator elements, e.g., lead zirconate titanate (PZT). Other architectures may utilize a film-based design. Although embodiments are described herein with respect to an array of ultrasonic transducers, the methods and techniques may be applied to other ultrasonic sensing architectures where the control of the operating parameters of different segments of the sensors can be adjusted separately to correct for the non-uniform contact surface. The embodiments described herein are with respect to sensors with a non-uniform contact layer, but the techniques and principles discussed may in some situations also be used to improve performance of sensors with uniform contact surfaces.

FIG. 1A is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections on the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., a structural stiffening layer) to mechanically stiffen the layers. In various embodiments, mechanical support layer 112 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include liquid, gel-like materials, epoxy, or other materials selected for good acoustic matching in order to support transmission of acoustic signals through to platen layer 116. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116. It should be appreciated that platen layer 116 can include one or more materials, including without limitation: glass, plastic, metal (e.g., aluminum, titanium, stainless steel), etc. In some embodiments, platen 116 is a display device (e.g., an organic light emitting diode (OLED) display device) overlying one or more PMUT devices. In such an embodiment, platen 116 includes multiple layers of the display device. These multiple layers can be made up of layers with similar range of acoustic impedance (e.g., in a flexible OLED display) or layers with different acoustic impedance.

Figure 1B:
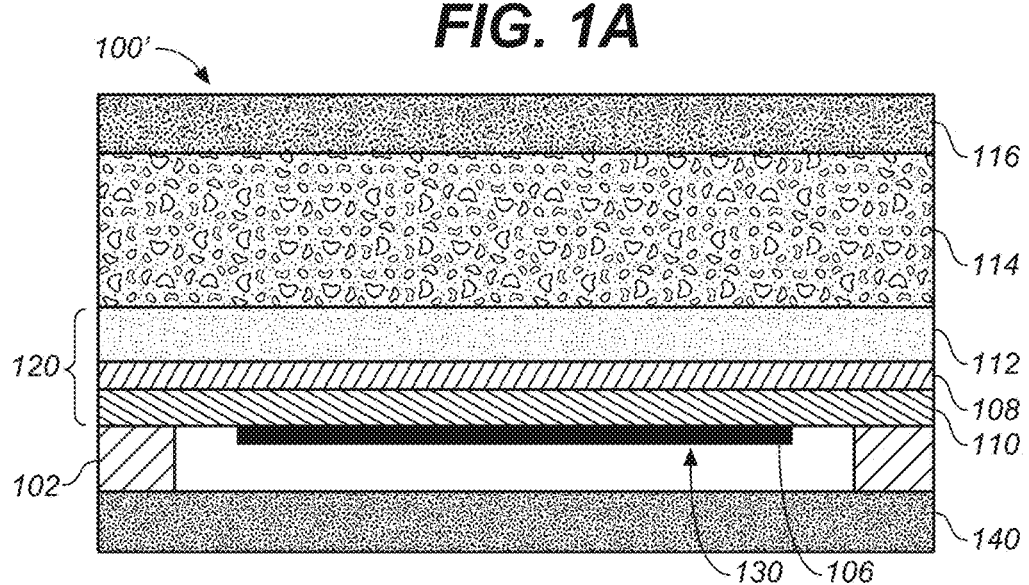
FIG. 1B is a diagram illustrating a PMUT device having an unpinned membrane, according to some embodiments.

FIG. 1B is identical to FIG. 1A in every way, except that the PMUT device 100' of FIG. 1B omits the interior support 104 and thus membrane 120 is not pinned (e.g., is "unpinned"). There may be instances in which an unpinned membrane 120 is desired. However, in other instances, a pinned membrane 120 may be employed.

Figure 2:
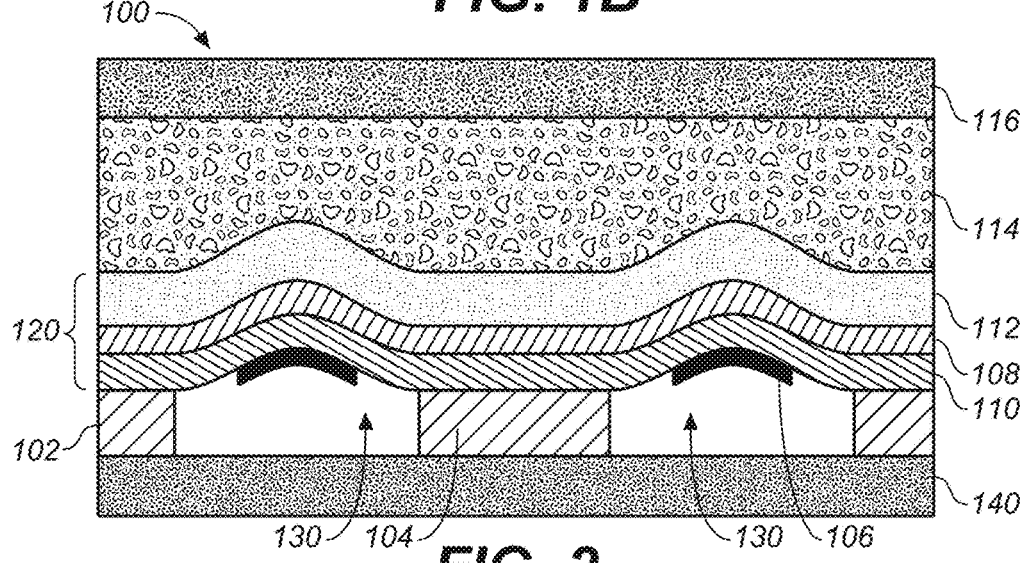
FIG. 2 is a diagram illustrating an example of membrane movement during activation of a PMUT device, according to some embodiments.

FIG. 2 is a diagram illustrating an example of membrane movement during activation of PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogonous device structures.

In various embodiments, the PMUT device 100 employs a piezoelectric layer 110, comprised of materials such as, but not limited to, aluminum nitride (AlN), scandium doped aluminum nitride (ScAlN), lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic beam and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Figure 10:
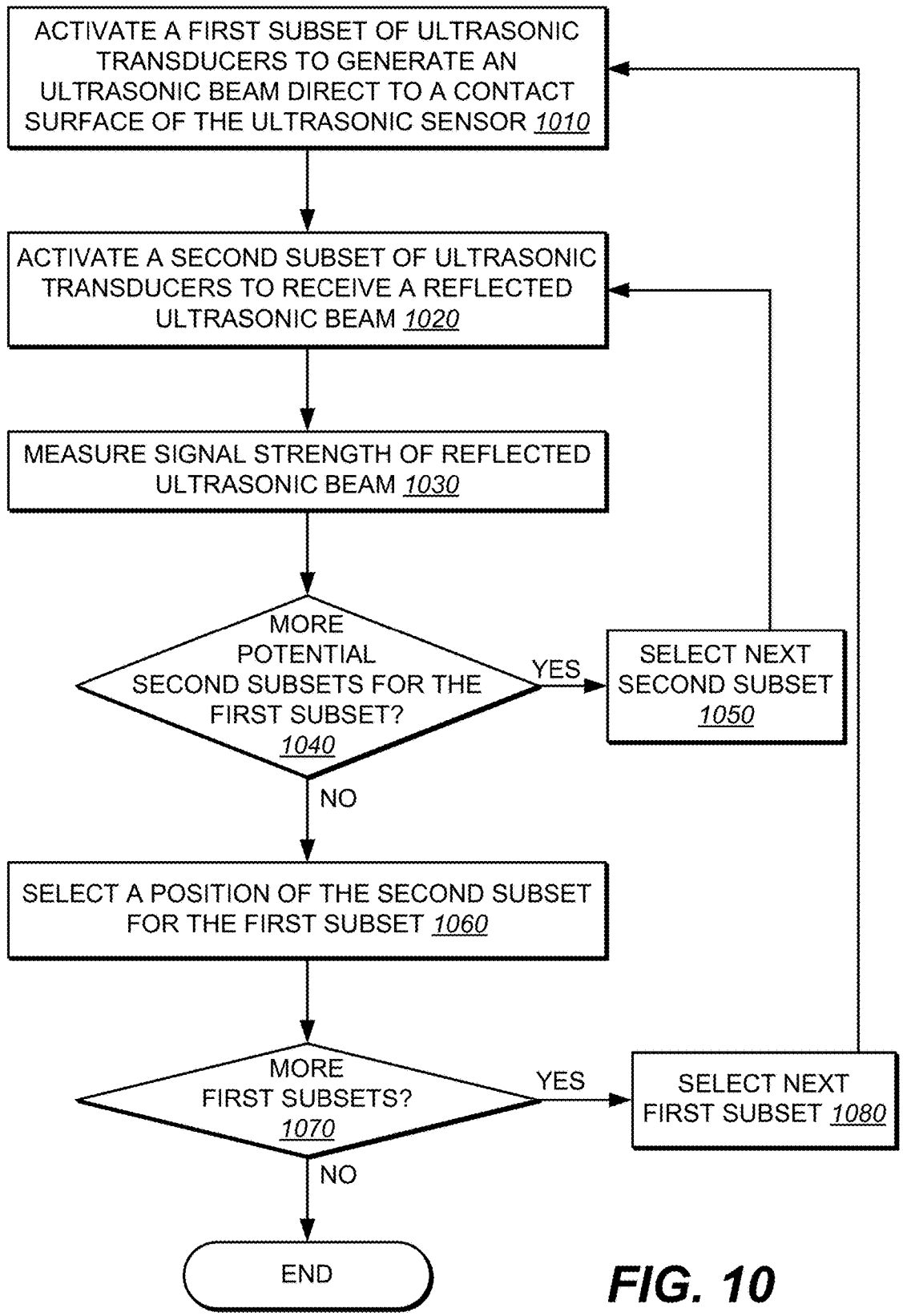
FIG. 10 illustrates a flow diagram of an example method for calibrating an ultrasonic sensor, according to embodiments.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, Aluminum (Al)/Titanium (Ti), Platinum (Pt), Molybdenum (Mo), etc., which are coupled with and on opposing sides of the piezoelectric layer 110. In one embodiment, PMUT device also includes a third electrode, as illustrated in FIG. 10 and described below.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 MRayl, such as, but not limited to, plastic, resin, rubber, Teflon, epoxy, etc. In another example, the platen layer 116 can comprise various materials having a high acoustic impedance (e.g., an acoustic impendence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6\times10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, MN, Titanium nitride (TiN), Silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., Aluminum (Al)/Titanium (Ti), Molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
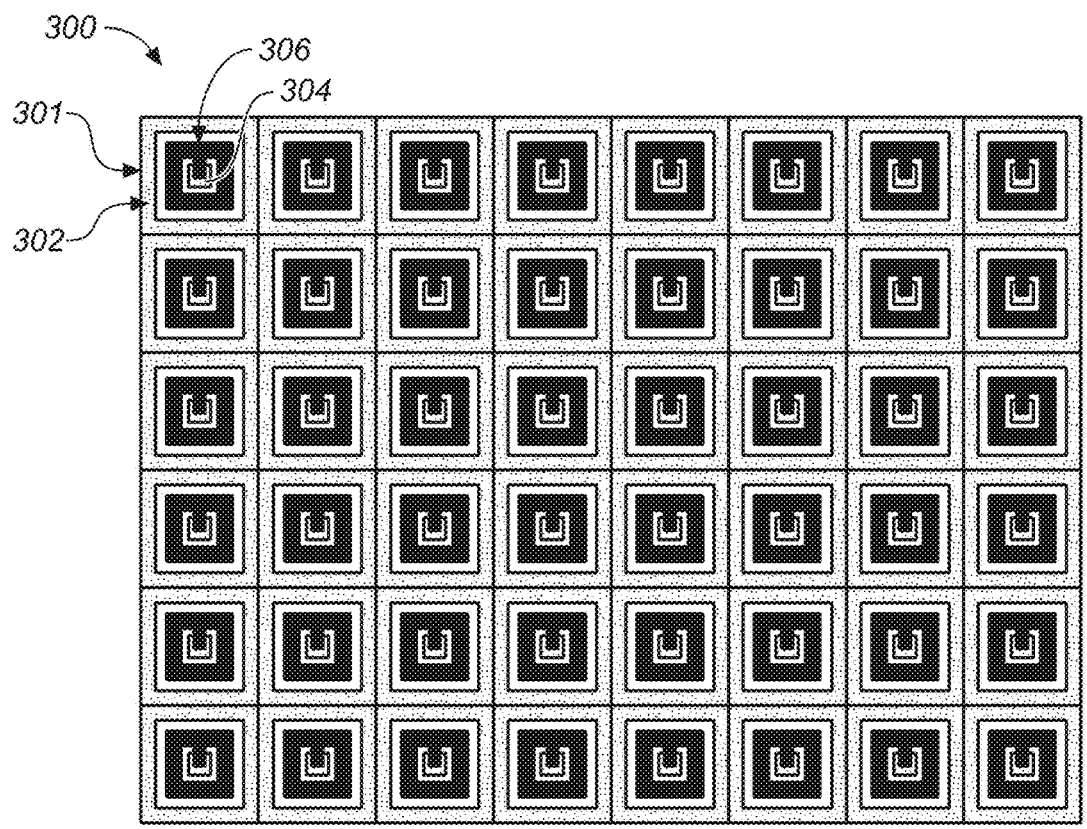
FIG. 3 illustrates an example array of square-shaped PMUT devices, according to some embodiments.

FIG. 3 illustrates an example two-dimensional array 300 of square-shaped PMUT devices 301 formed from PMUT devices having a substantially square shape similar to that discussed in conjunction with FIGS. 1A, 1B, and 2. Layout of square surrounding edge support 302, interior support 304, and square-shaped lower electrode 306 surrounding the interior support 304 are illustrated, while other continuous layers are not shown for clarity. As illustrated, array 300 includes columns of square-shaped PMUT devices 301 that are in rows and columns. It should be appreciated that rows or columns of the square-shaped PMUT devices 301 may be offset. Moreover, it should be appreciated that square-shaped PMUT devices 301 may contact each other or be spaced apart. In various embodiments, adjacent square-shaped PMUT devices 301 are electrically isolated. In other embodiments, groups of adjacent square-shaped PMUT devices 301 are electrically connected, where the groups of adjacent square-shaped PMUT devices 301 are electrically isolated.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

Figure 4A:
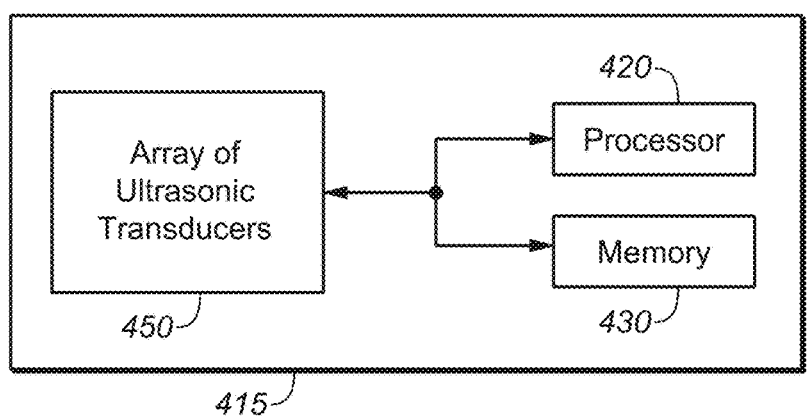
FIG. 4A illustrates an example fingerprint sensor, in accordance with various embodiments.

FIG. 4A illustrates an example fingerprint sensor 415, in accordance with various embodiments. In one embodiment, fingerprint sensor 415 includes an array 450 of ultrasonic transducers (e.g., PMUT devices), a processor 420, and a memory 430. It should be appreciated that some or all operations can be performed a processor external to fingerprint sensor 415 (e.g., a host processor or an application processor) In various embodiments, processor 420 performs certain operations in accordance with instructions stored within memory 430. It should be appreciated that components of fingerprint sensor 415 are examples, and that certain components, such as processor 420 and/or memory 430 may not be located within fingerprint sensor 415.

In one embodiment, fingerprint sensor 415 includes processor 420 for performing the pixel capture, where pixel capture is performed using subsets of ultrasonic transducers (e.g., PMUTs) of fingerprint sensor 415. In some embodiments, pixel capture for groups of pixels is handled the same, such that the groups of pixels utilize same imaging operations (e.g., utilize a same relative activation of the first subset of ultrasonic transducers for transmitting an ultrasonic beam and the second subset of ultrasonic transducers for receiving a reflected ultrasonic beam according to a same local angle). In some embodiments, processor 420 can perform at least some signal analysis, e.g., thresholding, to determine whether an object has interacted with fingerprint sensor 415. In other embodiments, processor 420 can analyze captured pixels and determine whether the object has characteristics of finger, e.g., a pattern resembling the ridge/valley pattern of a fingerprint. In other embodiments, processor 420 can capture an image of the fingerprint and forward it to a processor of system circuitry for further analysis.

In accordance with embodiments, processor 420 is configured to control the activation of the subsets of ultrasonic transducers to generate an ultrasonic signal, also referred to herein as an ultrasonic beam. Using multiple ultrasonic transducers, each driven by the same pulse waveform with varying time delays, embodiments described herein provide for focusing a transmit beam (e.g., beamforming) of an ultrasonic signal to a desired point, allowing for high resolution sensing of a fingerprint, or other object. For instance, transmitting an ultrasonic signal from multiple PMUTs, where some PMUTs transmit at a time delay relative to other PMUTs, provides for focusing the ultrasonic beam to a contact point of a fingerprint sensing system (e.g., a top of a platen layer) to image a pixel associated with the transmitting PMUTs. In some embodiments, the activation includes transmitting ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam. The activation also includes receiving reflected ultrasonic signals at a second group of ultrasonic transducers of the plurality of ultrasonic transducers.

While the embodiment of FIG. 4A includes processor 420 and memory 430, as described above, it should be appreciated that various functions of processor 420 and memory 430 may reside in other components of an electronic device. Moreover, it should be appreciated that processor 420 may be any type of processor for performing any portion of the described functionality (e.g., custom digital logic).

Figure 4B:
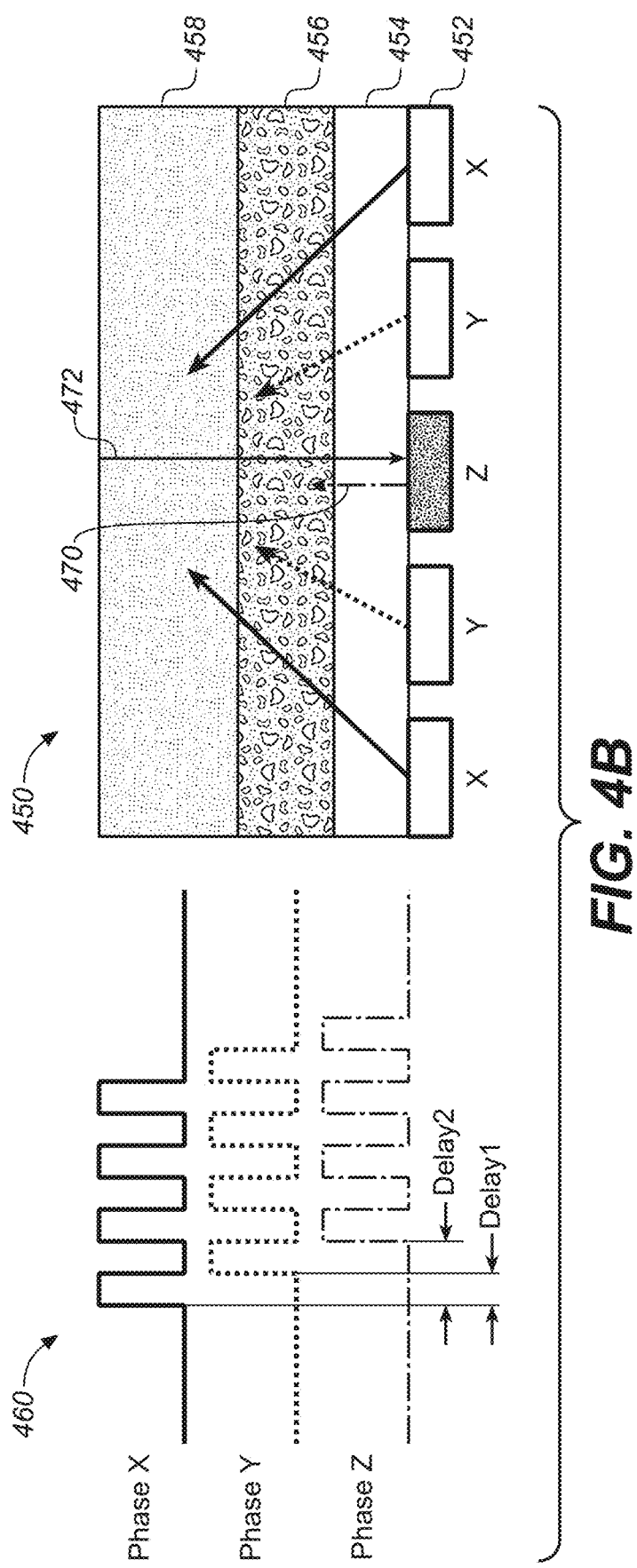
FIG. 4B illustrates an example array of ultrasonic transducers with phase delayed transmission, according to some embodiments.

FIG. 4B illustrates an example array 450 of ultrasonic transducers with phase delayed transmission, according to some embodiments. As illustrated, FIG. 4B shows ultrasonic beam transmission and reception using a one-dimensional, five-element, array 450 of ultrasonic transducers having phase delayed inputs 460. In various embodiments, array 450 is comprised of PMUT devices having a center pinned membrane (e.g., PMUT device 100 of FIG. 1).

As illustrated, array 450 includes five ultrasonic transducers 452 including a piezoelectric material and activating electrodes that are overlaid by a plurality of material layers 454, 456, and 458. In some embodiments, layer 454 is a stiffening layer (e.g., a mechanical support layer), layer 456 is an acoustic coupling layer, and layer 458 is a platen layer. In one embodiment, the material of layer 456 has an acoustic impedance selected to be between the acoustic impedance of layers 454 and 458. In one embodiment, the material of layer 456 has an acoustic impedance selected to be close the acoustic impedance of layer 458, to reduce unwanted acoustic reflections and improve ultrasonic beam transmission and sensing. However, alternative material stacks to the one shown in FIG. 4B may be used and certain layers may be added or omitted. It should be appreciated that the medium through which transmission occurs passes signals in a predictable way.

In operation, and as illustrated in FIG. 4B, the ultrasonic transducers 452 labelled with an "x" are triggered to emit ultrasonic waves at an initial time. At a second time, (e.g., 1-100 nanoseconds later), the ultrasonic transducers 452 labelled with a "y" are triggered. At a third time (e.g., 1-100 nanoseconds after the second time) the ultrasonic transducer 452 labelled with a "z" is triggered. The ultrasonic waves interfere transmitted at different times cause interference with each other, effectively resulting in a single high intensity beam 470 that exits the platen layer 458, contacts objects, such as a finger (not shown), that contact the platen layer 458, and is in part reflected back to the ultrasonic transducers. In one embodiment, the ultrasonic transducers 452 are switched from a transmission mode to a reception mode, allowing the "z" ultrasonic transducer to detect any reflected signals 472. In other words, the phase delay pattern of the ultrasonic transducers 452 is symmetric about the focal point where high intensity beam 470 exits platen layer 458.

It should be appreciated that an ultrasonic transducer 452 of array 450 may be used to transmit and/or receive an ultrasonic signal, and that the illustrated embodiment is a non-limiting example. The received signal (e.g., generated based on reflections, echoes, etc. of the acoustic signal from an object contacting or near the platen layer 458) can then be analyzed. As an example, an image of the object, a distance of the object from the sensing component, acoustic impedance of the object, a motion of the object, etc., can all be determined based on comparing a frequency, amplitude, phase and/or arrival time of the received signal with a frequency, amplitude, phase and/or transmission time of the transmitted acoustic signal. Moreover, results generated can be further analyzed or presented to a user via a display device (not shown).

Example Ultrasonic Sensor Having a Contact Layer of Non-Uniform Thickness

Fingerprint sensors are used in electronic devices for user authentication, such as mobile electronic devices, building locks, automobile locks, etc. In many situations, the surface area of the fingerprint sensor needs to be as flat and as uniform as possible to provide good contact with the finger in order to obtain a food fingerprint image. However, in some situation it may be desirable to have a non-flat fingerprint surface and/or a contact layer of non-uniform thickness. For example, when a fingerprint sensor is mounted on the back of a mobile phone, a concave form or structured surface may help guide the user's finger to the correct position on the FP sensor. In other situations, the design employs a non-flat form factor, such as a convex button, a rounded door knob or automobile handle. Some designs may require a smooth surface, while other designs may require a rough or textured surface. In further situations, the fingerprint sensor may be integrated in a wearable device, e.g., a smart watch, either on the face of the watch (e.g., behind the display), or on the side of the body. While in the former placement the surface can be relatively flat, in the latter placement the sensor surface may have a small radius of curvature. For example, a sensor placed on the side of a phone would have a relatively small radius of curvature when compared to a sensor placed on the face of the phone. In general, the smaller the device, or section of the device, where the sensor is integrated, the smaller the radius of curvature, i.e., the more curved the surface is.

Currently, there are different technologies employed by fingerprint sensors for obtaining a fingerprint, including ultrasonic sensing, capacitive sensing, and optical sensing. For instance, for capacitive sensing and optical sensing to perform properly, the sensing layer must be parallel with the contact layer. Otherwise, the signals received may be distorted in a way that precludes proper imaging. In particular, for a capacitive or optical fingerprint sensor to image through a layer of non-uniform thickness, the capacitive or optical fingerprint sensor would be required to be specially manufactured to conform to the non-uniform surface. However, the tailored manufacture of fingerprint sensors is a costly endeavor, impacting the adoption of such tailored fingerprint sensors within commodity devices.

Embodiments described herein provide an ultrasonic fingerprint sensor comprising a substantially flat two-dimensional array of ultrasonic transducers and a contact layer of non-uniform thickness overlying the two-dimensional array, where the imaging operation is performed through the contact layer of non-uniform thickness. As used herein, the term "substantially" means mostly, primarily, or completely. In particular, the ultrasonic sensor described herein can operate using a two-dimensional array of ultrasonic transducers that is capable of sensing through a contact layer of uniform or non-uniform thickness without having to modify the two-dimensional array of ultrasonic transducers. Embodiments provided herein control the operating parameters of the ultrasonic fingerprint sensor to correct for the non-uniform thickness of the contact layer, generating an image. Although embodiments are described with respect to an array of ultrasonic transducers, the methods and techniques may be applied to other ultrasound sensing architectures where the control of the operating parameters of different segments of the sensors can be adjusted separately to correct for the non-uniform thickness of the contact layer. As utilized herein, a contact layer of non-uniform thickness is non-uniform with respect to the shape (e.g., non-flat) of at least a portion of the contact layer. It should be appreciated that the described embodiments are applicable to embodiments where a sensing layer (e.g., a two-dimensional array of ultrasonic transducers) is not parallel to the contact surface. For example, embodiments described herein may be applicable to a non-flat two-dimensional array of ultrasonic transducers where the contact layer overlying the non-flat two-dimensional array of ultrasonic transducers has a non-uniform thickness.

Figure 5A:
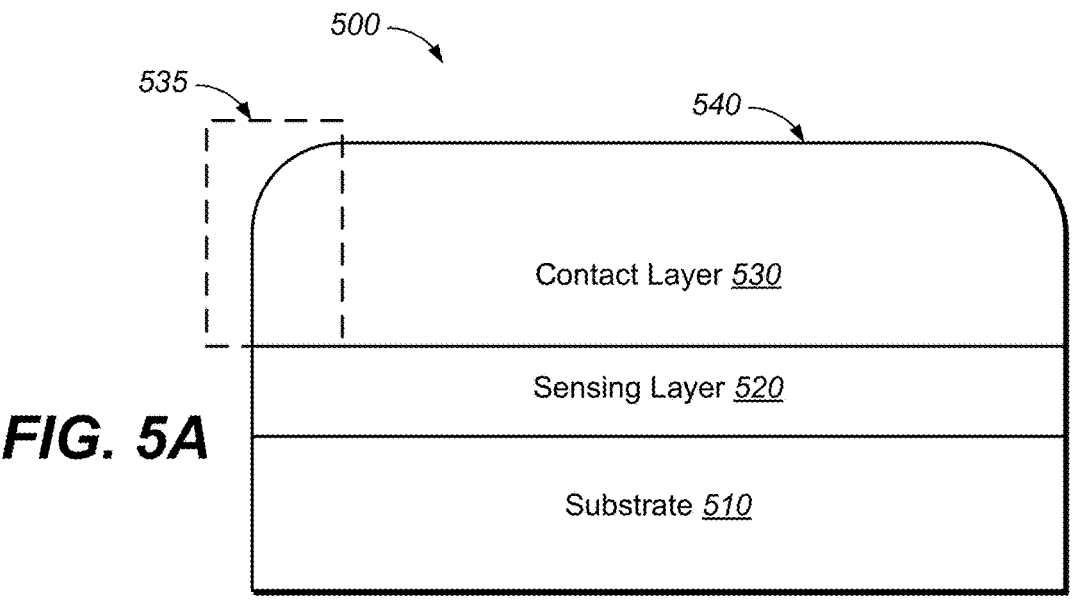
FIGS. 5A, 5B, and 5C illustrates cross section views of ultrasonic fingerprint sensors having contact layers of varying thicknesses, according to an embodiment.

FIG. 5A illustrates a cross section view of an ultrasonic fingerprint sensor 500, according to an embodiment. As illustrated, ultrasonic fingerprint sensor 500 includes several different layers. Ultrasonic fingerprint sensor 500 includes an active sensing layer 520 on top of a substrate 510. The active sensing layer 520 may use various techniques to sense or detect the fingerprint, e.g., acoustic or ultrasonic techniques. It should be appreciated that active sensing layer 520 may not extend to the edges of contact layer 530. For an ultrasonic fingerprint sensor, the sensing layer may comprise an array of ultrasonic transducers (e.g., PMUTs 100 of FIG. 1A, PMUTs 100' of FIG. 1B, or bulk piezo actuator elements) that may be used emit and detect ultrasonic waves. Contact layer 530 overlays sensing layer 520, where the outer surface of contact layer 530 is contact surface 540. Contact surface 540 of contact layer 530 is rounded at edge regions (as indicated by box 535), and is substantially flat and parallel to sensing layer in the interior region. For example, a user using ultrasonic fingerprint sensor 500 places his or her finger in contact with contact surface 540.

In some embodiments, an acoustic coupling layer, and/or other layers such as display devices, (not shown) may be used between sensing layer 520 and contact layer 530 onto which the user puts his or her finger. It should be appreciated that in some embodiments, contact layer 530 and the acoustic coupling layer are a single layer. It should be further appreciated that ultrasonic fingerprint sensor 500 may include other layers, such as bonding layers and laminate layers, and is not intended to be limited to the specific layers shown. In other embodiments, an ultrasonic fingerprint sensor including separate signal transmission and signal detection layers may be used (e.g., within sensing layer 520).

In an ultrasonic fingerprint sensor 500, the acoustic waves travel from the sensing layer 520 through contact layer 530 to contact surface 540, interact with the object on the surface (e.g., a finger), and may then be reflected back to the sensing layer 520, thereby again traversing the contact layer 530. The time from the emission of the waves to the detection of the waves is the time-of-flight (ToF) and depends on the acoustic properties and thicknesses of the contact layer and/or acoustic coupling layer. Due to the varying thickness of contact layer 530 at the edge regions of contact layer 530 (indicated by box 535), an ultrasonic beam sent from sensing layer 520 at a direction perpendicular to the surface of sensing layer 520 would be reflected at contact surface 540 to a different location on sensing layer 520 than the location from which the ultrasonic beam was transmitted. This may also impact the ToF and the signal strength of the ultrasonic beam, as the path traversed by the ultrasonic beam would be longer where the reflection is at an angle other than perpendicular to the contact surface. In some embodiments, in order to select the signal of interest, e.g., the signal from waves directly reflected from the object on the surface, a measurement window is used.

Figure 5B:
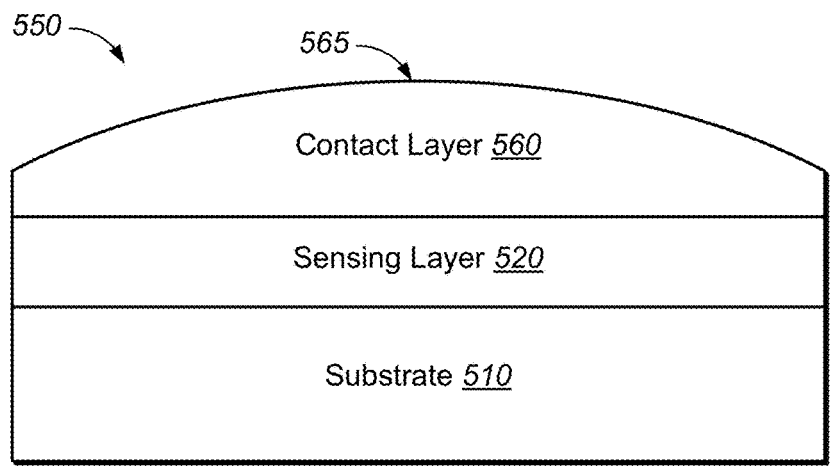

FIG. 5B illustrates a cross section view of an ultrasonic fingerprint sensor 550, according to another embodiment. Ultrasonic fingerprint sensor 550 operates in a similar manner to, and includes the components of, ultrasonic fingerprint sensor 500 of FIG. 5A, with the exception of the shape of contact layer 560. As illustrated, contact layer 560 has a convex profile, such that contact surface 565 is not flat. While one point or small region of contact surface 565 may be parallel to sensing layer 520 (e.g., the mid-point or peak of the convex shape), contact surface 565 is substantially non-flat and non-parallel to substantially flat sensing layer 520.

Due to the varying thickness of contact layer 560, an ultrasonic beam sent from sensing layer 520 at a direction perpendicular to the surface of sensing layer 520 would be reflected at contact surface 565 to a different location on sensing layer 520 than the location from which the ultrasonic beam was transmitted (with the exception of a region of contact layer 560 parallel to sensing layer 520). This may also impact the ToF and signal strength of the ultrasonic beam, as the path traversed by the ultrasonic beam would be longer where the reflection is at an angle other than perpendicular to the contact surface. In some embodiments, in order to select the signal of interest, e.g., the signal from waves directly reflected from the object on the surface, a measurement window is used.

Figure 5C:
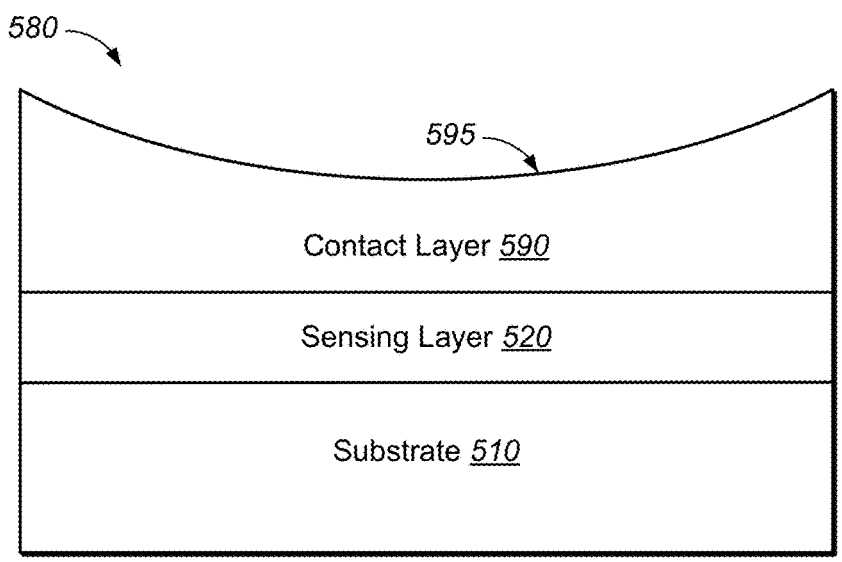

FIG. 5C illustrates a cross section view of an ultrasonic fingerprint sensor 580, according to another embodiment. Ultrasonic fingerprint sensor 580 operates in a similar manner to, and includes the components of, ultrasonic fingerprint sensor 500 of FIG. 5A, with the exception of the shape of contact layer 590. As illustrated, contact layer 590 has a concave profile, such that contact surface 595 is not flat. While one point or small region of contact surface 595 may be parallel to sensing layer 520 (e.g., the mid-point or valley of the concave shape), contact surface 595 is substantially non-flat and non-parallel to substantially flat sensing layer 520.

Due to the varying thickness of contact layer 590, an ultrasonic beam sent from sensing layer 520 at a direction perpendicular to the surface of sensing layer 520 would be reflected at contact surface 595 to a different location on sensing layer 520 than the location from which the ultrasonic beam was transmitted (with the exception of a region of contact layer 560 parallel to sensing layer 520). This may also impact the ToF and the signal strength of the ultrasonic beam, as the path traversed by the ultrasonic beam would be longer where the reflection is at an angle other than perpendicular to the contact surface. In some embodiments, in order to select the signal of interest, e.g., the signal from waves directly reflected from the object on the surface, a measurement window is used.

Figure 6A:
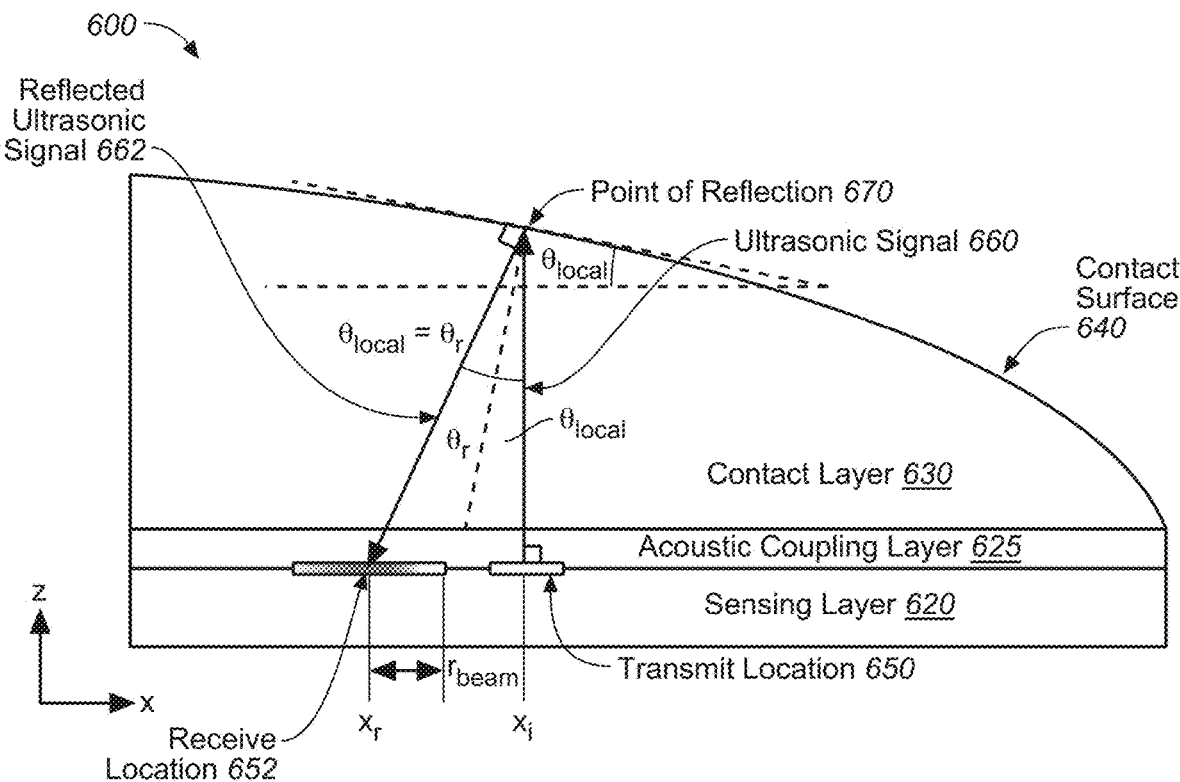
FIG. 6A illustrates an example of an ultrasonic beam reflected at a contact surface to a different location on sensing layer than the location from which the ultrasonic beam was transmitted, according to an embodiment.

FIG. 6A illustrates an example of an ultrasonic beam reflected at a contact surface to a different location on sensing layer than the location from which the ultrasonic beam was transmitted, according to an embodiment. While the example illustrated in FIG. 6A is simplified (e.g., contact surface 640 is curved), it should be appreciated that the illustrated concept is applicable to any non-flat contact surface (e.g., a contact layer 630 of non-uniform thickness). Moreover, the concept illustrated in FIG. 6A is applicable in three dimensions, and not intended to be limited to the two dimensions as illustrated.

Ultrasonic sensor 600 operates in a similar manner to, and includes the components of, ultrasonic fingerprint sensor 500 of FIG. 5A. As illustrated, ultrasonic sensor 600 includes sensing layer 620 acoustic coupling layer 625, and contact layer 630 having contact surface 640. During a pixel imaging operation, ultrasonic beam 660 is generated at sensing layer 620 (e.g., generated using multiple ultrasonic transducers) and transmitted perpendicular to the surface of sensing layer 620. Ultrasonic beam 660 travels through acoustic coupling layer 625 and contact layer 630 to point of reflection 670 on contact surface 640, where at least a portion of ultrasonic beam 660 reflects off contact surface 640 and is directed back toward sensing layer 620 as reflected ultrasonic beam 662.

It should be appreciated that the local angle ($\theta_{local}$) between sensing layer 620 and the point of reflection 670 on contact surface 640 determines a location of receive location ($x_r$) 652 relative to transmit location ($x_i$) 650. As used herein, the local angle ($\theta_{local}$) refers to the angle between a contact surface and a surface of a sensing layer at the point of reflection of a transmitted ultrasonic beam. For example, and as illustrated, ultrasonic beam 660 is generated at transmit location 650 of sensing layer 620, interacts with contact surface 640 at point of reflection 670, and is directed back to receive location 652 of sensing layer 620 as reflected ultrasonic beam 662. As shown, the angle of reflection ($\theta_r$) is equal to the local (incident) angle, such that the angle between transmitted beam 660 and reflected beam 662 is twice the local angle and thus receive location 652 is at a different location than transmit location 650. Moreover, the ToF of reflected ultrasonic beam 662 is longer than the ToF of ultrasonic beam 660, and the radius of the beamspot ($r_{beam}$) of reflected ultrasonic beam 662 may lie substantially outside the original transmit location 650, thereby resulting in a loss of the ultrasonic signal.

Embodiments described herein provide a sensor device including a two-dimensional array of ultrasonic transducers, wherein the two-dimensional array of ultrasonic transducers is substantially flat, and a contact layer having a non-uniform thickness overlying the two-dimensional array of ultrasonic transducers, and methods for using such a device, to account for a local angle between the two-dimensional array of ultrasonic transducers and the contact surface where an ultrasonic beam interacts with the contact surface. During an imaging operation for capturing a pixel of a plurality of pixels, a first subset of ultrasonic transducers (e.g., at transmit location 650) of the two-dimensional array of ultrasonic transducers is activated to generate an ultrasonic beam directed to a contact surface of the contact layer. A second subset of ultrasonic transducers (e.g., at receive location 652) of the two-dimensional array of ultrasonic transducers is activated to receive a reflected ultrasonic beam, wherein the second subset of ultrasonic transducers is at a location within the two-dimensional array of ultrasonic transducers to account for the local angle between the two-dimensional array of ultrasonic transducers and the contact surface where the ultrasonic beam interacts with the contact surface. The local angle varies depending on a position of the contact layer above the sensing layer, such that a location of the second subset of ultrasonic transducers depends on the local angle and the angle of the transmitted ultrasonic beam. It should be appreciated that the local angle is a fixed characteristic of the ultrasonic sensor, and may be known or determined using calibration.

Figure 6B:
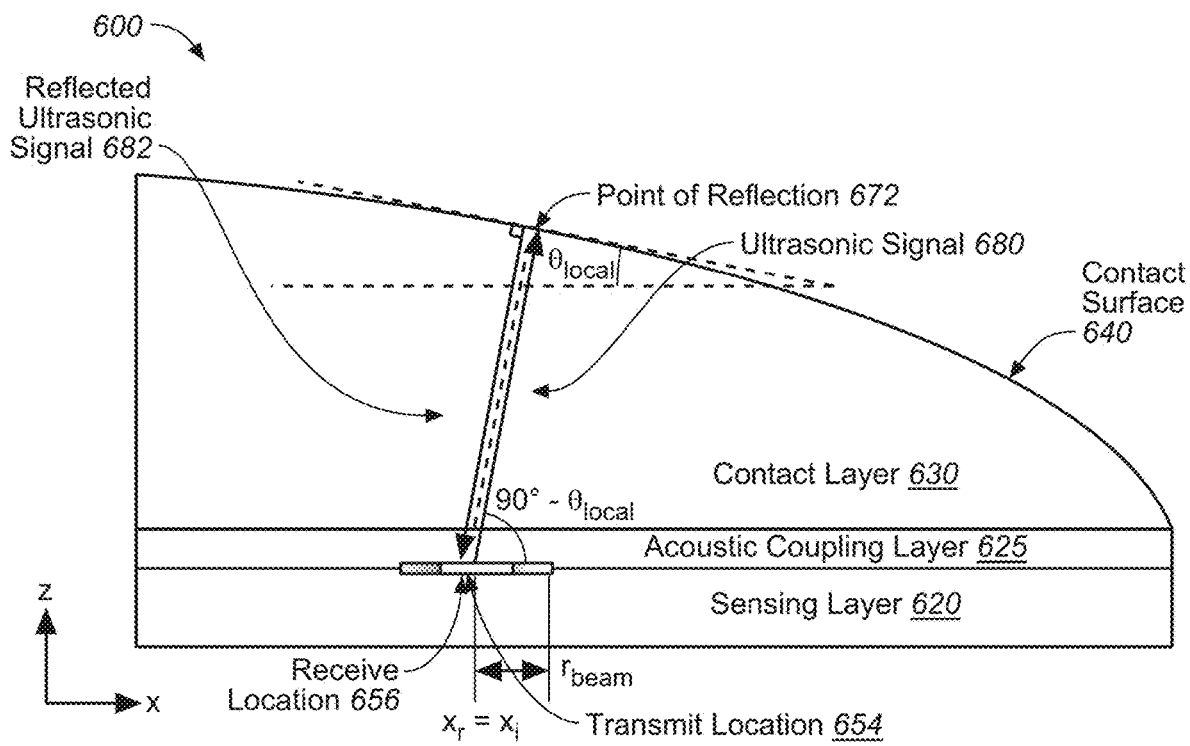
FIG. 6B illustrates an example of an ultrasonic beam reflected at a contact surface to a return to the location from which the ultrasonic beam was transmitted, according to an embodiment.

FIG. 6B illustrates an example of an ultrasonic beam reflected at a contact surface to a return to the location from which the ultrasonic beam was transmitted, according to an embodiment. FIG. 6B illustrates an example where ultrasonic sensor 600 uses beam steering to steer ultrasonic signal 680 such that reflected ultrasonic signal 682 is received substantially at the point of transmission. In such an embodiment, the angle of transmission is equal to 90 degrees minus local angle ($\theta_{local}$). It should be appreciated that the illustrated example applies to situations where acoustic coupling layer 625 and contact layer 630 have similar or identical refractive characteristics. Where ultrasonic signal 680 and reflected ultrasonic signal 682 travel through multiple layers having different refractive characteristics, it is possible that the angle of transmission is not equal to 90 degrees minus local angle ($\theta_{local}$). However, each of the multiple layers will have known refractive characteristics, and the angle of transmission can be determined that results in reflected ultrasonic signal 682 being received substantially at the point of transmission.

Figure 7A:
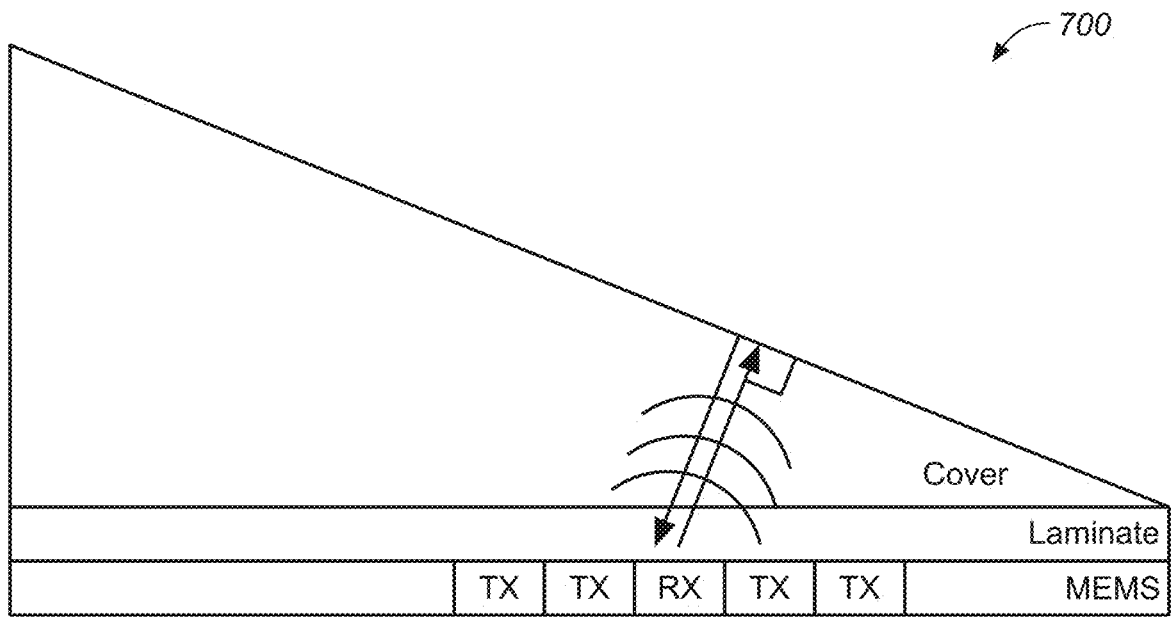
FIG. 7A illustrates a cross section view of an example ultrasonic sensor in which the ultrasonic beam is focused perpendicular to the contact surface of the contact layer, according to an embodiment.

FIG. 7A illustrates a profile view of an example ultrasonic sensor 700 in which the ultrasonic beam is focused and steered such that the reflected ultrasonic beam is directed back to the transmit location, such that the receive location can be collocated with or circumscribed by the transmit location, according to an embodiment. For example, where the stack is homogeneous, the ultrasonic beam is focused and steered perpendicular to the contact surface of the contact layer. By focusing and steering the ultrasonic beam perpendicular to the contact surface, the reflected ultrasonic beam is directed back to the transmit location, such that the receive location can be collocated with or circumscribed by the transmit location. In some embodiments, a beamforming pattern of ultrasonic transducers of the sensing layer is used to direct the ultrasonic beam at a non-perpendicular angle relative to the sensing layer.

With reference to FIG. 7A, ultrasonic sensor 700 operates in a similar manner to, and includes the components of, ultrasonic fingerprint sensor 500 of FIG. 5A. As illustrated, ultrasonic sensor 700 includes sensing layer 720 acoustic coupling layer 725, and contact layer 730 having contact surface 740. During a pixel imaging operation, ultrasonic beam 780 is generated at sensing layer 720 (e.g., generated using multiple ultrasonic transducers) and transmitted at an angle perpendicular to the contact surface 740. The direction of ultrasonic beam 780 is achieved by applying individual time delays to the drive signal of the transmitting subset of ultrasonic transducers. Ultrasonic beam 780 travels through acoustic coupling layer 725 and contact layer 730 to point of reflection 772 on contact surface 740, where at least a portion of ultrasonic beam 780 reflects of contact surface 740 and is directed back toward sensing layer 720 as reflected ultrasonic beam 782.

By directing the ultrasonic beam 780 toward contact surface 740 at an angle perpendicular to contact surface, transmit location 754 and receive location 756 may be collocated, where transmit location 754 is the center of a beamforming pattern for generating ultrasonic beam 780 and receive location 756 is the center of the receive pattern for receiving reflected ultrasonic beam 782.

Figure 7B:
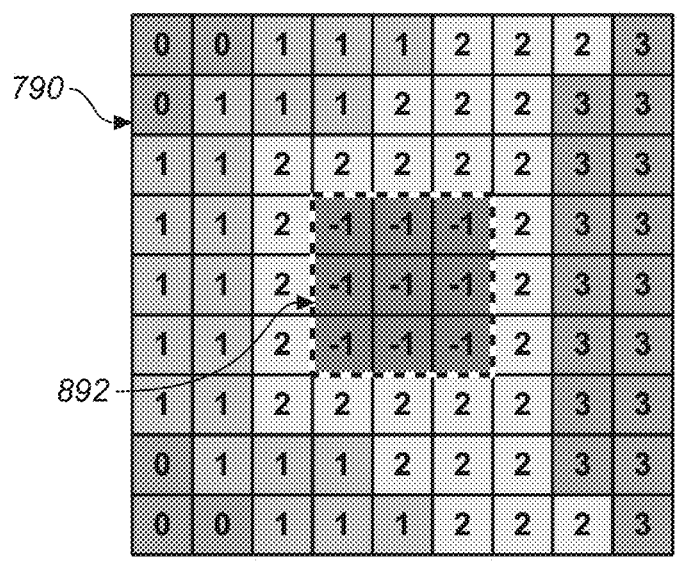
FIG. 7B illustrates an example transmit beamforming pattern and receive pattern of ultrasonic transducers of an ultrasonic sensor in which the ultrasonic beam is focused perpendicular to the contact surface of the contact layer, according to an embodiment.

With reference to FIG. 7B, an example transmit beamforming pattern 790 and receive pattern 792 of ultrasonic transducers of an ultrasonic sensor is shown. The transmitting subset of ultrasonic transducers along with relative time delays indicated by positive values has non-symmetric time delays across the horizontal axis, and skews the resulting beamform wave in the horizontal direction. The transmitting subset of ultrasonic transducers has time delays symmetric across the vertical axis, and focuses the beam in the vertical direction. Activation of the receive subset of ultrasonic transducers indicated by negative values in a local area near or within the transmitting subset of ultrasonic transducers allows most of the signal to be received when the ultrasonic beam is steered perpendicular to the contact surface 740 at the point of reflection 770. FIG. 4B illustrates an example use of relative time delays to beamform a transmitted beam, according to some embodiments.

As illustrated, transmit beamforming pattern 790 includes the 9×9 ultrasonic transducers excluding the middle 3×3 ultrasonic transducers (marked as receive pattern 792). Transmit beamforming pattern 790 indicates the relative time delays between activation of the respective ultrasonic transducers, where ultrasonic transducers marked as "1" are activated first, ultrasonic transducers marked as "2" are activated second, and ultrasonic transducers marked as "3" are activated third. In the illustrated example, ultrasonic transducers marked as "0" are not activated during transmit beamforming. It should be appreciated that the illustrated values are simply for illustrating the grouping and relative activation of ultrasonic transducers, and that any type of delay is possible such that the resulting ultrasonic beam is steered towards a desired point of reflection 770 resulting in the receipt of the reflected ultrasonic beam 782 at receive pattern 792. The illustrated transmit beamforming pattern 790 steers the beam to be focused towards the later activated ultrasonic transducers (e.g., to the right of FIG. 7B). Receive beamforming pattern 792 includes the ultrasonic transducers marked as "−1", and are activated after transmit beamforming patter 790.

Figure 8A:
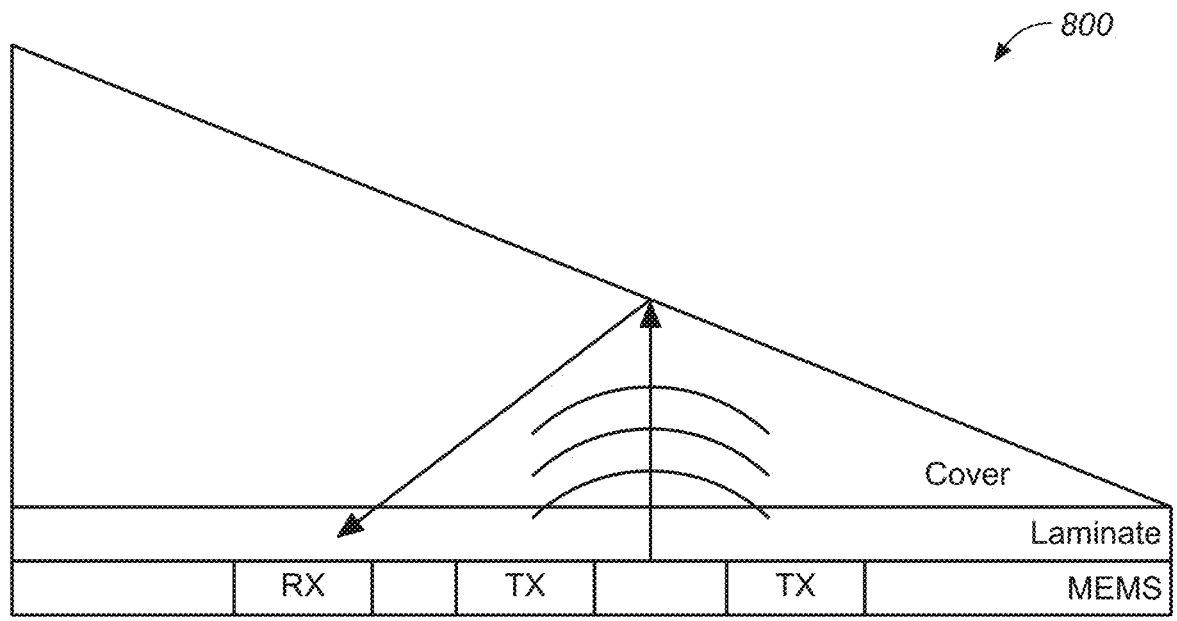
FIG. 8A illustrates a profile view of an example ultrasonic sensor in which the ultrasonic beam is focused perpendicular to the surface of the sensing layer, according to an embodiment.

FIG. 8A illustrates a profile view of an example ultrasonic sensor 800 in which the ultrasonic beam is focused perpendicular to the surface of the sensing layer, according to an embodiment. By focusing the ultrasonic beam perpendicular to the surface of the sensing layer, the reflected ultrasonic beam is directed back to a receive location that is different than the transmit location. Knowledge of the location of the receive location relative to the transmit location allows for the activation of the appropriate receive pattern of ultrasonic transducers for the particular transmit location. The optimal receive location can be determined by calculation from knowledge of layer geometries and material acoustic properties, or simulation involving the aforementioned attributes. In some embodiments, the incident angle of the transmitted ultrasound wave is not perpendicular to the contact surface resulting in a reflection angle between the ultrasonic beam and the reflected ultrasonic beam to be nonzero.

With reference to FIG. 8A, ultrasonic sensor 800 operates in a similar manner to, and includes the components of, ultrasonic fingerprint sensor 500 of FIG. 5A. As illustrated, ultrasonic sensor 800 includes sensing layer 820 acoustic coupling layer 825, and contact layer 830 having contact surface 840. During a pixel imaging operation, ultrasonic beam 860 is generated at sensing layer 820 (e.g., generated using multiple ultrasonic transducers) and transmitted at an angle perpendicular to the surface of sensing layer 820. Ultrasonic beam 860 travels through acoustic coupling layer 825 and contact layer 830 to point of reflection 870 on contact surface 840, where at least a portion of ultrasonic beam 860 reflects of contact surface 840 and is directed back toward sensing layer 820 as reflected ultrasonic beam 862.

Using the local angle between sensing layer 820 and contact surface 840 at point of reflection 870, the location of receive location 852 relative to transmit location 850 can be determined (e.g., as shown in FIG. 6A). Where the local angle is non-perpendicular, receive location 852 and transmit location 850 will not be collocated.

Figure 8B:
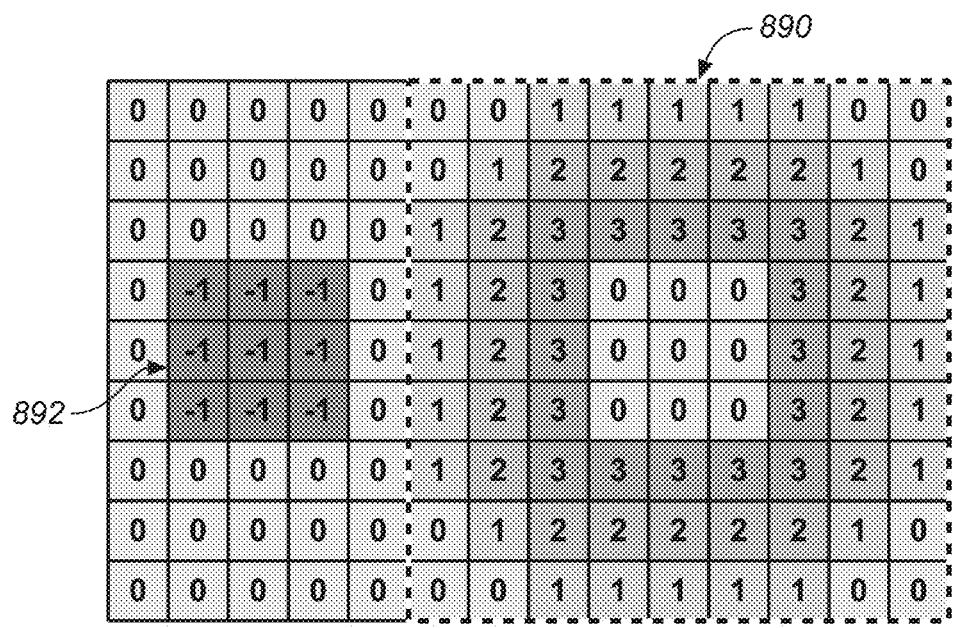
FIG. 8B, illustrates an example transmit beamforming pattern and receive pattern of ultrasonic transducers of an ultrasonic sensor in which the ultrasonic beam is focused perpendicular to the surface of the sensing layer, according to an embodiment.

With reference to FIG. 8B, an example transmit beamforming pattern and receive pattern of ultrasonic transducers of an ultrasonic sensor is shown. The transmitting subset of ultrasonic transducers along with time delays indicated by positive values has symmetric time delays in both the horizontal and vertical directions. This allows for the ultrasonic beam to be generated and concentrated upwards to hit the contact surface 840 vertically. Due to the local curvature at the contact surface 840, the return ultrasonic signal will return at angle equal to the incident angle. Activation of the receive subset of ultrasonic transducers indicated by negative values will be skewed to a local area outside of the transmitting subset of ultrasonic transducers. The angle and direction of the return signal will determine the position of the receive subset relative to the transmit subset of ultrasonic transducers.

As illustrated, transmit beamforming pattern 890 includes 9×9 ultrasonic transducers and receive pattern includes 3×3 ultrasonic transducers. Transmit beamforming pattern 890 indicates the relative time delays between activation of the respective ultrasonic transducers, where ultrasonic transducers marked as "1" are activated first, ultrasonic transducers marked as "2" are activated second, and ultrasonic transducers marked as "3" are activated third. In the illustrated example, ultrasonic transducers marked as "0" are not activated during transmit beamforming. It should be appreciated that the illustrated values are simply for illustrating the grouping and relative activation of ultrasonic transducers, and that any type of delay is possible such that the resulting ultrasonic beam is steered towards a desired point of reflection 870 resulting in the receipt of the reflected ultrasonic beam 862 at receive pattern 892. The illustrated transmit beamforming pattern 890 steers the beam at a perpendicular angle from the sensor. Receive beamforming pattern 892 includes the ultrasonic transducers marked as "−1", and are activated after transmit beamforming patter 890.

In some embodiments, where the ultrasonic beam 860 is generated and transmitted at an angle perpendicular to the surface of sensing layer 820, a location of the receive location can be empirically determined (e.g., during calibration). For example, a beamforming pattern can be applied to a particular transmit location multiple times, where a different receive pattern of ultrasonic transducers can be applied each time. Selection of an appropriate receive pattern for the particular transmit location can be made, e.g., based on the signal strength of each receive pattern. For example, a receive pattern having a highest signal strength for the particular transmit location can be selected as the receive location for the particular transmit location. This process can be repeated at multiple transmit locations, thereby resulting in a determination of transmit locations and corresponding receive locations for the ultrasonic sensor.

With reference to FIG. 5A, in an ultrasonic fingerprint sensor, the acoustic waves travel from the sensing layer 520 through the contact layer 530 to contact surface 540, interact with the object on the surface (e.g., a finger), and may then be reflected back to the sensing layer 520, thereby again traversing the contact layer 530. The time from the emission of the waves to the detection of the waves is the time-of-flight (ToF) and depends on the acoustic properties and thicknesses of the different layers. Due to acoustic impedance differences of the different layers, multipath reflections, and other factors, the ultrasonic transducers may measure many different signals in addition to the signals directly reflected from the object on the surface. In order to select the signal of interest, i.e., the signal from waves directly reflected from the object on the surface, a measurement window is used.

The measurement windows may be determined based on the acoustic properties and thicknesses of the different layers. It should be appreciated that in practice the measurement window may be used to isolate the signal of interest from undesired signals from the reflection of other layers and impurities (single-path or multi-path). To obtain a quality fingerprint image with as high as possible signal-to-noise (SNR) and or contrast-to-noise (CNR) ratios, the positioning and size of the measurement window is critical.

When the contact layer is uniform and the sensing layer and contact layer are substantially flat and parallel, the selected ToF (range) for best performance is essentially identical for all ultrasonic transducers. The same measurement window settings can therefore be applied to all transducers. Even if there is a slight variation in the ToF of different transducers or different segments of the sensor, a single measurement window may be defined that works well enough for all transducers. However, when the ToF changes are too large, using a single measurement window will degrade the quality of the image. For example, if the contact layer is not flat, but rather a gradient-like structure (e.g., convex or concave) as indicated in contact layer 530 of ultrasonic fingerprint sensor 500 of FIG. 5A, contact layer 560 of ultrasonic fingerprint sensor 550 of FIG. 5B, or contact layer 590 of ultrasonic fingerprint sensor 580 of FIG. 5C, the length of the traveled path of the ultrasound waves for different transducers of different sections of the sensors varies. Therefore, a single measurement window to cover the large differences in ToF will not work in practice because too much undesired signal would be measured and would therefore decrease the SNR and/or CNR. Thus, for fingerprint sensors with a not-flat contact surface an adaptive ToF method can be used that corrects for the non-uniform effects.

In an example adaptive ToF method, first the optimal ToF to obtain the desired performance is determined for different ultrasonic transducers or different sections of the sensor. Next, a ToF map, ToF listing, or ToF index is created which links the optimum TOF to the different transducers and or segments of the sensor. For example, with reference to FIG. 6A, once a receive location 652 is known for a transmit location 650, the ToF can be calculated for the transmit/receive operation. The TOF map, listing, or index is then used to control the measurement window setting for the different transducers/pixels. The linking may be based on the location of the transducers. For example, a ToF map can be created, where groups of transducers having ToF values within a range are created, allowing for grouped control of the measurement windows for each group. When the ToF information is used to control the measurement window, in general the timing of the transmission of the ultrasonic waves from the different transducers or different section is not adapted. In other embodiments, instead of controlling the measurement window, the transmission timing of the ultrasonic waves may be adapted to correct for the non-uniform contact surface.

Once the ToF has been determined and stored, it may be applied to determine the correct operational settings of the measurement windows for the respective subsets of transducers. Regular updates of the ToF map may be performed to make sure the optimum ToF is always available. The update may be regularly in time, or may be triggered by certain events or operational conditions, such as e.g., high motion or acceleration, mechanical shock, (fast) temperature change, extreme temperatures, etc.

In some embodiments, each ultrasonic transducer or group of ultrasonic transducers may be controlled using a determined optimum ToF, where the measurement window is shifted in time according to the optimum ToF. The width of the measurement window may be adapted to the received signal and the variation in the ToF over the selected transducers. The larger the number of transducers that are combined, the higher the possibility that there is a variation of the ToF, and therefore the wider/longer the size of the integration window. A distribution of the optimum ToF values may be determined, and the applied setting may be chosen to comprise a predefined portion or percentage of the distribution. In one embodiment, only a single measurement window size is used, and the ToF investigation is used to determine what the variation in ToF across the sensor surface is, and then the window size is adapted accordingly to capture the desired signal or depending on the ToF distribution.

In some architectures, the measurement window may not be changeable or adaptable for individual transducers, and therefore in some embodiments the measurement window may be divided in a number of sub-windows each having a certain ToF range. Then, based on the optimum ToF for a certain transducer or set of transducers, one or more of the sub-windows are selected corresponding to the optimal ToF. For example, in some architectures, where control of the transducers is collective, in order to capture signals for the entire array of the ultrasonic sensor, the measurement window must be big enough to capture signals over the entire ToF range. In other architectures, where transducers are controllable at a more granular level (e.g., grouped control or individual control), the measurement windows for groups of transducers or individual transducers can be tuned according to the ToF range for the groups of transducers or individual transducers. It should be appreciated that there is a tradeoff between the granular control of transducers and the number of distinct measurement windows. For instance, granular control provides higher quality measurement of received signals, but requires more complicated control mechanisms (e.g., driving circuit, routing, etc.) and might result in higher power consumption. Moreover, it should be appreciated that an ultrasonic fingerprint sensor capable of granular control of transducers utilize the granular control during operations requiring high degrees of precision, while using collective control of the transducers during operations that do not require high degrees of precision.

In the discussion above, the measurements window is varied to correct for the difference in time-of-flight. In alternative embodiments, the measurement window may be constant but the transmission timing may be adapted for the different pixels, so that even with a different ToF, the signal of interest still is measured within the static measurement window. In some embodiments, the transmission timing and the measurement window are both adapted to correct for the differences in ToF. In such embodiments, the ToF map is used to control the transmission of signals from different groups of transducers or individual transducers, such that signals might be transmitted at different times, but are received within a constant measurement window.

FIGS. 9 and 10 illustrate flow diagrams of example methods for operating a fingerprint sensor comprised of ultrasonic transducers, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

FIG. 9 illustrates a flow diagram 900 of an example method for capturing an image at an ultrasonic transducer, according to an embodiment. At procedure 910 of flow diagram 900, an imaging operation is performed at a plurality of positions within a two-dimensional array of ultrasonic transducers of the ultrasonic sensor to generate a plurality of pixels, wherein the two-dimensional array of ultrasonic transducers is substantially flat. Procedures 920, 930, and 940 are performed at each position of the plurality of positions. In one embodiment, the plurality of positions are sectioned into groups of positions, wherein positions within each group of positions utilize a same relative activation of the first subset of ultrasonic transducers and the second subset of ultrasonic transducers according to a same local angle. For example, with reference to FIG. 5A, positions at the edge region of fingerprint sensor 500, indicated by box 535) may have one activation operation for the constituent ultrasonic transducers, and positions in the middle section of fingerprint sensor 500 (those positions excluding box 535) may have another activation operation for the constituent ultrasonic transducers. It should be appreciated that operation of similarly situated ultrasonic transducers for generating ultrasonic beams at the same or similar local angle of reflection can be grouped together such that operation of the grouped ultrasonic transducers can be performed for pixel imaging.

At procedure 920, a first subset of ultrasonic transducers of the two-dimensional array of ultrasonic transducers is activated to generate an ultrasonic beam directed to a contact surface of a contact layer of the ultrasonic sensor, the contact layer overlying the two-dimensional array of ultrasonic transducers and having a non-uniform thickness resulting in a non-parallel angle to the sensing layer of the ultrasonic sensor.

In one embodiment, as shown at procedure 922, the activating the first subset of ultrasonic transducers of the two-dimensional array of ultrasonic transducers includes activating the first subset of ultrasonic transducers of the two-dimensional array of ultrasonic transducers to generate the ultrasonic beam such that the reflected ultrasonic beam is received substantially at the point of transmission. In one embodiment, the ultrasonic beam is focused perpendicular to the contact surface of the contact layer (e.g., as shown in FIG. 7A). The activation of the individual ultrasonic transducers within the first subset involves time delaying the drive signal in an asymmetric pattern to focus the beam in a direction perpendicular to the contact surface (e.g., as shown in FIG. 7B). In one embodiment, a transmit angle between the ultrasonic beam and the two-dimensional array of ultrasonic transducers for at least a portion of positions of the plurality of positions is not a perpendicular angle.

In another embodiment, as shown at procedure 924, activating the first subset of ultrasonic transducers of the two-dimensional array of ultrasonic transducers includes activating the first subset of ultrasonic transducers of the two-dimensional array of ultrasonic transducers to generate the ultrasonic beam such that the ultrasonic beam is focused perpendicular to the two-dimensional array of ultrasonic transducers. In one embodiment, a reflection angle between the ultrasonic beam and the reflected ultrasonic beam for at least a portion of positions of the plurality of positions is not a perpendicular angle.

At procedure 930, a second subset of ultrasonic transducers of the two-dimensional array of ultrasonic transducers is activated to receive a reflected ultrasonic beam, wherein the second subset of ultrasonic transducers is at a location within the two-dimensional array of ultrasonic transducers to account for a local angle between the two-dimensional array of ultrasonic transducers and the contact surface where the ultrasonic beam interacts with the contact surface.

In one embodiment, as shown at procedure 932, the activating the second subset of ultrasonic transducers of the two-dimensional array of ultrasonic transducers includes activating the second subset of ultrasonic transducers of the two-dimensional array of ultrasonic transducers such that the second subset of ultrasonic transducers is circumscribed by the first subset of ultrasonic transducers (e.g., as shown in FIG. 7B).

In another embodiment, as shown at procedure 934, the activating the second subset of ultrasonic transducers of the two-dimensional array of ultrasonic transducers includes activating the second subset of ultrasonic transducers of the two-dimensional array of ultrasonic transducers such that the second subset of ultrasonic transducers is not circumscribed by the first subset of ultrasonic transducers (e.g., as shown in FIG. 8B).

At procedure 940, a pixel is generated using the reflected ultrasonic beam. In one embodiment, as shown at procedure 945, a plurality of image segments is generated by combining pixels corresponding to each group of positions into image segments. Each image segment can correspond to pixels generated by groups of transducers using the same relative activation and processing of signals that correspond to the local angle and/or thickness of the general position within the sensing area.

At procedure 950, the image is generated by combining the plurality of pixels generated at the plurality of positions. In one embodiment, the image is generated by combining the plurality of image segments.

FIG. 10 illustrates a flow diagram 1000 of an example method for calibrating an ultrasonic sensor, according to an embodiment. At procedure 1010 of flow diagram 1000, a first subset of ultrasonic transducers of a two-dimensional array of ultrasonic transducers of the ultrasonic sensor is activated to generate an ultrasonic beam directed to a contact surface of a contact layer overlying the two-dimensional array of ultrasonic transducers, wherein the two-dimensional array of ultrasonic transducers is substantially flat and wherein the contact layer has a non-uniform thickness.

At procedure 1020, a second subset of ultrasonic transducers of the two-dimensional array of ultrasonic transducers is activated at a position relative to the first subset of ultrasonic transducers to receive a reflected ultrasonic beam. At procedure 1030, a signal strength of the reflected ultrasonic beam is measured at the position.

At procedure 1040, it is determined if there are more potential positions for the second subset of ultrasonic transducers relative to the first subset of ultrasonic transducers. It should be appreciated that the potential positions can be determined and evaluated symmetrically (e.g., spiraling out from a center position), a raster-scan pattern, or any other pattern. For example, if the local angle is known for the first subset, the position of the second subset can be estimated and used as a starting point. If there are more potential second subsets of ultrasonic transducers, the next second subset of ultrasonic transducers is selected, as shown at procedure 1050, and procedures 1010, 1020, and 1030 are repeated for this second subset of ultrasonic transducers. Procedures 1010, 1020, and 1030 are repeated where the first subset of ultrasonic transducers remains at a static position within the two-dimensional array of ultrasonic transducers and the second subset of ultrasonic transducers is moved to a different position of a plurality of positions within the two-dimensional array of ultrasonic transducers subsequent each activating the first subset of ultrasonic transducers of a two-dimensional array.

At procedure 1040, if determined if there are not more potential positions for the second subset of ultrasonic transducers relative to the first subset of ultrasonic transducers, flow diagram 1000 proceeds to procedure 1060. At procedure 1060, a position of the plurality of positions is selected as the second subset of ultrasonic transducers corresponding to the first subset of ultrasonic transducers for use during an imaging operation based on the signal strength.

At procedure 1070, it is determined if there are more first subsets of ultrasonic transducers where there is no selected second subset of ultrasonic transducers. If there are more first subsets of ultrasonic transducers, the next first subset of ultrasonic transducers is selected, as shown at procedure 1080, and procedures 1010 through 1070 are repeated for this first subset of ultrasonic transducers. Procedures 1010 through 1070 are repeated where the first subset of ultrasonic transducers remains at a static position within the two-dimensional array of ultrasonic transducers and the second subset of ultrasonic transducers is moved to a different position of a plurality of positions within the two-dimensional array of ultrasonic transducers subsequent each activating the first subset of ultrasonic transducers of a two-dimensional array.

At procedure 1070, if determined if there are no more first subset subsets of ultrasonic transducers where there is no selected second subset of ultrasonic transducers, calibration of the ultrasonic sensor is complete and flow diagram 1000 ends.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. An ultrasonic sensor comprising:
   a two-dimensional array of ultrasonic transducers, wherein the two-dimensional array of ultrasonic transducers is substantially flat;
   a contact layer having a non-uniform thickness overlying the two-dimensional array of ultrasonic transducers; and
   an array controller configured to control activation of ultrasonic transducers during an imaging operation for imaging a plurality of pixels at a plurality of positions within the two-dimensional array of ultrasonic transducers, such that for imaging a pixel of the plurality of pixels, the array controller is configured to:
      activate a first subset of ultrasonic transducers of the two-dimensional array of ultrasonic transducers to generate an ultrasonic beam directed to a contact surface of the contact layer; and
      activate a second subset of ultrasonic transducers of the two-dimensional array of ultrasonic transducers to receive a reflected ultrasonic beam, wherein the second subset of ultrasonic transducers is at a location within the two-dimensional array of ultrasonic transducers to account for a local angle between the two-dimensional array of ultrasonic transducers and the contact surface where the ultrasonic beam interacts with the contact surface.

2. The ultrasonic sensor of claim 1, wherein the array controller is configured to activate the first subset of ultrasonic transducers of the two-dimensional array of ultrasonic transducers to generate the ultrasonic beam such that the ultrasonic beam is focused perpendicular to the contact surface of the contact layer.

3. The ultrasonic sensor of claim 2, wherein a transmit angle between the ultrasonic beam and the two-dimensional array of ultrasonic transducers for at least a portion of positions of the plurality of positions is not a perpendicular angle.

4. The ultrasonic sensor of claim 2, wherein the array controller is configured to activate the second subset of ultrasonic transducers of the two-dimensional array of ultrasonic transducers such that the second subset of ultrasonic transducers is circumscribed by the first subset of ultrasonic transducers.

5. The ultrasonic sensor of claim 1, wherein the array controller is configured to activate the first subset of ultrasonic transducers of the two-dimensional array of ultrasonic transducers to generate the ultrasonic beam such that the ultrasonic beam is focused perpendicular to the two-dimensional array of ultrasonic transducers.

6. The ultrasonic sensor of claim 5, wherein a reflection angle between the ultrasonic beam and the reflected ultrasonic beam for at least a portion of positions of the plurality of positions is not a perpendicular angle.

7. The ultrasonic sensor of claim 5, wherein the array controller is configured to activate the second subset of ultrasonic transducers of the two-dimensional array of ultrasonic transducers such that the second subset of ultrasonic transducers is not circumscribed by the first subset of ultrasonic transducers.

8. The ultrasonic sensor of claim 1, wherein the array controller is configured to activate the first subset of ultrasonic transducers of the two-dimensional array of ultrasonic transducers to generate and steer the ultrasonic beam toward the contact surface such that the reflected ultrasonic beam is received at the second subset of ultrasonic transducers, wherein the first subset of ultrasonic transducers and the second subset of ultrasonic transducers are substantially collocated.

9. The ultrasonic sensor of claim 1, wherein the array controller is further configured to:
   combine the plurality of pixels captured at the plurality of positions into an image.

10. A method for capturing an image at an ultrasonic sensor, the method comprising:
    performing an imaging operation at a plurality of positions within a two-dimensional array of ultrasonic transducers of the ultrasonic sensor to generate a plurality of pixels, wherein the two-dimensional array of ultrasonic transducers is substantially flat, at each position of the plurality of positions:
       activating a first subset of ultrasonic transducers of the two-dimensional array of ultrasonic transducers to generate an ultrasonic beam directed to on a contact surface of a contact layer of the ultrasonic sensor, the contact layer having a non-uniform thickness and overlying the two-dimensional array of ultrasonic transducers;
       activating a second subset of ultrasonic transducers of the two-dimensional array of ultrasonic transducers to receive a reflected ultrasonic beam, wherein the second subset of ultrasonic transducers is at a location within the two-dimensional array of ultrasonic transducers to account for a local angle between the two-dimensional array of ultrasonic transducers and the contact surface where the ultrasonic beam interacts with the contact surface; and
       generating a pixel using the reflected ultrasonic beam; and
    generating the image by combining the plurality of pixels generated at the plurality of positions.

11. The method of claim 10, wherein the activating the first subset of ultrasonic transducers of the two-dimensional array of ultrasonic transducers comprises:
    activating the first subset of ultrasonic transducers of the two-dimensional array of ultrasonic transducers to generate the ultrasonic beam such that the ultrasonic beam is focused perpendicular to the contact surface of the contact layer.

12. The method of claim 11, wherein a transmit angle between the ultrasonic beam and the two-dimensional array of ultrasonic transducers for at least a portion of positions of the plurality of positions is not a perpendicular angle.

13. The method of claim 11, wherein the activating the second subset of ultrasonic transducers of the two-dimensional array of ultrasonic transducers comprises:
    activating the second subset of ultrasonic transducers of the two-dimensional array of ultrasonic transducers such that the second subset of ultrasonic transducers is circumscribed by the first subset of ultrasonic transducers.

14. The method of claim 10, wherein the activating the first subset of ultrasonic transducers of the two-dimensional array of ultrasonic transducers comprises:
    activating the first subset of ultrasonic transducers of the two-dimensional array of ultrasonic transducers to generate the ultrasonic beam such that the ultrasonic beam is focused perpendicular to the two-dimensional array of ultrasonic transducers.

15. The method of claim 14, wherein a reflection angle between the ultrasonic beam and the reflected ultrasonic beam for at least a portion of positions of the plurality of positions is not a perpendicular angle.

16. The method of claim 14, wherein the activating the second subset of ultrasonic transducers of the two-dimensional array of ultrasonic transducers comprises:
    activating the second subset of ultrasonic transducers of the two-dimensional array of ultrasonic transducers such that the second subset of ultrasonic transducers is not circumscribed by the first subset of ultrasonic transducers.

17. The method of claim 14, wherein the activating the second subset of ultrasonic transducers of the two-dimensional array of ultrasonic transducers comprises:
    activating the first subset of ultrasonic transducers of the two-dimensional array of ultrasonic transducers to generate and steer the ultrasonic beam toward the contact surface such that the reflected ultrasonic beam is received at the second subset of ultrasonic transducers, wherein the first subset of ultrasonic transducers and the second subset of ultrasonic transducers are substantially collocated.

18. The method of claim 10, wherein the plurality of positions are sectioned into groups of positions, wherein positions within each group of positions utilize a same relative activation of the first subset of ultrasonic transducers and the second subset of ultrasonic transducers according to a same local angle.

19. The method of claim 18, further comprising:
    generating a plurality of image segments by combining pixels corresponding to each group of positions into image segments.

20. The method of claim 19, wherein the generating the image by combining the plurality of pixels generated at the plurality of positions comprises:
    generating the image by combining the plurality of image segments.

21. A method for calibrating an ultrasonic sensor, the method comprising:
    activating a first subset of ultrasonic transducers of a two-dimensional array of ultrasonic transducers of the ultrasonic sensor to generate an ultrasonic beam directed to a contact surface of a contact layer overlying the two-dimensional array of ultrasonic transducers, wherein the two-dimensional array of ultrasonic transducers is substantially flat and wherein the contact layer has a non-uniform thickness;
    activating a second subset of ultrasonic transducers of the two-dimensional array of ultrasonic transducers to receive a reflected ultrasonic beam;
    repeating the activating the first subset of ultrasonic transducers of a two-dimensional array and the activating the second subset of ultrasonic transducers of a two-dimensional array, wherein the first subset of ultrasonic transducers remain at a static position within the two-dimensional array of ultrasonic transducers and the second subset of ultrasonic transducers is moved to a different position of a plurality of positions within the two-dimensional array of ultrasonic transducers subsequent each activating the first subset of ultrasonic transducers of a two-dimensional array;
    measuring a signal strength of the reflected ultrasonic beam at each position of the plurality of positions; and
    selecting a position of the plurality of positions as the second subset of ultrasonic transducers corresponding to the first subset of ultrasonic transducers for use during an imaging operation based on the signal strength.

22. The method of claim 21, wherein the method is repeated for a plurality of first subsets of ultrasonic transducers, wherein the plurality of first subsets of ultrasonic transducers is less than all possible first subsets of ultrasonic transducers, the method further comprising:
    determining positions of the second subsets of ultrasonic transducers corresponding to first subsets of ultrasonic transducers not within the plurality of first subsets of ultrasonic transducers based on selected positions of the second subsets of ultrasonic transducers corresponding to the plurality of first subsets of ultrasonic transducers.

* * * * *